United States Patent
Yoo et al.

(10) Patent No.: US 10,129,146 B2
(45) Date of Patent: Nov. 13, 2018

(54) METHODS AND APPARATUS FOR PROVIDING MOBILITY IN ETHERNET NETWORK

(71) Applicant: ELECTRONICS AND TELECOMMUNICATIONS RESEARCH INSTITUTE, Daejeon (KR)

(72) Inventors: Tae Whan Yoo, Daejeon (KR); Jong Tae Song, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 67 days.

(21) Appl. No.: 15/352,888

(22) Filed: Nov. 16, 2016

(65) Prior Publication Data

US 2017/0142008 A1 May 18, 2017

(30) Foreign Application Priority Data

Nov. 17, 2015 (KR) .................. 10-2015-0161114
Nov. 16, 2016 (KR) .................. 10-2016-0152442

(51) Int. Cl.
*H04L 12/741* (2013.01)
*H04L 12/721* (2013.01)
*H04L 12/06* (2006.01)
*H04W 36/00* (2009.01)
*H04L 12/753* (2013.01)
*H04W 36/12* (2009.01)

(52) U.S. Cl.
CPC .............. *H04L 45/74* (2013.01); *H04L 45/48* (2013.01); *H04L 45/66* (2013.01); *H04W 36/0011* (2013.01); *H04W 36/12* (2013.01)

(58) Field of Classification Search
CPC ......................... H04L 45/74; H04W 36/0011
See application file for complete search history.

(56) References Cited

U.S. PATENT DOCUMENTS 7,849,217 B2  12/2010  Meier

FOREIGN PATENT DOCUMENTS

KR   10-2008-0068430 A   7/2008
WO   2007/067000 A1      6/2007

*Primary Examiner* — Kevin C. Harper
*Assistant Examiner* — Henry Baron
(74) *Attorney, Agent, or Firm* — LRK Patent Law Firm

(57) ABSTRACT

A method and apparatus for providing a mobility in an Ethernet network. An Ethernet switch receives an Ethernet frame through a port of the Ethernet switch, and transmits the Ethernet frame to an upper Ethernet switch through a root port of the Ethernet switch based on whether a forwarding information for a destination address of the Ethernet frame exists in a forwarding table.

15 Claims, 18 Drawing Sheets

METHODS AND APPARATUS FOR PROVIDING MOBILITY IN ETHERNET NETWORK

BACKGROUND OF THE INVENTION

1. Field of the Invention

One or more example embodiments relate to Ethernet network, and more particularly, to a method and apparatus for realizing a mobility in Ethernet network.

2. Description of Related Art

Packet-based mobile network related technologies may include, for example, a 3rd Generation Partnership Project (3GPP) Evolved Packet Core (EPC) mobile communication network, an Institute of Electrical and Electronics Engineers (IEEE) 802.11 Wireless Fidelity (WiFi), an IEEE802.16e mobile Worldwide Interoperability for Microwave Access (WiMAX), an IEEE802.1 bridge network, and the like. A 3GPP EPC being the core network of a 3GPP mobile network, uses a tunneling network based on a General Packet Radio Service (GPRS) Tunneling Protocol (GTP), and establishes two GTP tunnels, each of which connects an eNodeB and a Serving Gateway (SGW), SGW and a Packet Data Network Gateway (PGW) respectively. The PGW is located at the center of the network and plays the role of the IP anchor point where all GTP tunnels are concentrated. All the traffic in 3GPP EPC should go through the PGW resulting in unnecessary heavy traffic load at the core network. As the mobile network traffic increases and the services are more sensitive to the transport delay, it is desirable to handle the local traffic in the local network without delivering into the core network.

Both the IEEE 802.11 WiFi and the IEEE802.16e mobile WiMAX may be Ethernet-based wireless Media Access Control (MAC) technologies. However, a WiFi Access Point (AP), a WiMAX Base Station (BS), and the like may operate as anchors of Internet Protocol (IP) mobility, and a network mobility is realized based on the IP mobility, and thus a mobility of an Ethernet network may not be required. When a coverage of an AP and a BS is reduced to increase a capacity per unit area, the network paths will be frequently changed due to the frequent hand-over of the mobile nodes between APs or BSs and therefore, a new mobility mechanism simpler than IP mobility may help solve this problem.

The IEEE802.1 bridge network which accommodates only the fixed terminals does not have the mobility functions. A Bridge Protocol Data Unit (BPDU) used to control a bridge node (for example, an Ethernet switch) implements only one set of protocols to support the dynamic topology change of Ethernet networks, for example, a Spanning Tree Protocol (STP) or a Rapid STP (RSTP). There is no mobility management protocol for Ethernet networks.

SUMMARY OF THE INVENTION

An aspect is to realize a mobility in the Ethernet layer for a seamless handover between Ethernet switches rather than processing a mobility protocol in Internet Protocol (IP) layer when a mobile terminal moves in Ethernet networks.

Another aspect is to merge various wireless Media Access Controls (MACs) access networks into the Institute of Electrical and Electronics Engineers (IEEE) 802.1 Ethernet network which implements the Ethernet network mobility proposed in this invention.

According to an aspect, the method to provide the mobility in Ethernet network includes the process to receive Ethernet frames through ports of an Ethernet switch; and the process to look up the destination MAC addresses of the received Ethernet frames in the forwarding table of the said Ethernet switch; and the process to forward some Ethernet frames through the forwarding ports provided by the forwarding table when the table provides the information for those Ethernet frames, and otherwise to forward the Ethernet frames through the root port so that the Ethernet frames can be either forwarded to the destination by some Ethernet switch in the upper part of the spanning tree or broadcast downwards to all switches after reaching the root switch. This procedure is different from the current forwarding rule for Ethernet frames.

In the case that the said Ethernet switch is the root switch, the root switch either discards the received Ethernet frames or broadcasts the Ethernet frames through all designated ports based on whether the destination address of the Ethernet frame exists in the forwarding table or not, respectively. When an Ethernet frame is broadcast, the source address is substituted with a special MAC address RFA1 indicating that it is reflected from the root switch.

The mobility method may further include a process that the Ethernet switch in the spanning tree branched out from the root switch receives the Ethernet frames broadcast from the root switch, omits the source address learning process for the reflected Ethernet frames, and forwards the reflected Ethernet frame having RFA1 for SA through all designated ports when the destination address of the Ethernet frame does not exist in the forwarding table. The mobility method may further include a process that an Ethernet switch to which the mobile node is newly connected generates a control signal to set up a path to reach the mobile node from any place in the Ethernet network and transmits it through the root port of the switch; the Ethernet switch received the path-setup signal confirms or adds the MAC address of the said mobile node into the forwarding table to indicate that the Ethernet frames destined for the said mobile node shall be forwarded through the port that the path-setup signal entered and sends the said path-setup signal through the root port so that the Ethernet switches in the upper part of the spanning tree conducts the same procedure eventually establishing a path reaching the mobile node from the root switch.

The mobility method may further include a process that the path-setup control signal is forwarded to the root port of the Ethernet switch even when the forwarding table of the Ethernet switch already has the correct port association for the MAC address of the said mobile terminal.

The mobility method may further include a process that the Ethernet switch updates the port association to the port through which the path-setup control signal is received, when the port associated with the MAC address of the said mobile node already exists in the forwarding table and it is different from the port through which the path-setup control signal has entered; the Ethernet switch generates a control signal to erase the path in the downwards in the spanning tree and sends it through the port to which the MAC address of the said mobile node was previously associated; the path-erase-downward control signal carries in its message the MAC address of the said mobile node and the MAC address of the new wireless access point to which the mobile node is newly connected.

The mobility method may further include a process that the path-setup control signal is eventually delivered to the root switch and the root switch then conducts the same procedures as the other Ethernet switches do including the port association for the MAC address of the said mobile node and the generation and transmission of path-erase-downwards control signal in case that the said MAC address was previously associated with the wrong port; the root switch terminates forwarding the path-setup control signal.

The mobility method may further include a process that an wireless access point (actually an Ethernet switch) to which a mobile node just lost connection generates a control signal to erase the path to reach the mobile node through the wireless access point and send the said path-erase-upwards control signal through the root port of the wireless access point; an Ethernet switch that receives the path-erase-upwards control signal erases the port association for the MAC address of the said mobile node and then forwards the control signal through its root port; the path-erase-upwards control signal will eventually delivered to the root switch, and the root switch conducts the same procedures as the other Ethernet switches do including the erasure of the port association for the said MAC address and then terminates forwarding the path-erase-upwards control signal.

If the Ethernet frames destined for a mobile node are delivered to an wireless access point to which the mobile terminal just lost connection, then they would be temporarily stored in the said old wireless access point for being retransmitted to the mobile node through the new correct access point after setting up the new path for the mobile node.

The mobility method may further include a process that an Ethernet switch receives the path-erase-downwards control signal carrying the MAC addresses of the mobile node and the new wireless access point in its message; the Ethernet switch discards the path-erase-downwards control signal when the port through which the control signal enters is not the root port and, otherwise, looks up the forwarding table, locates the port with which the MAC address of the mobile terminal is associated, forwards the path-erase-downwards control signal through the port and then erases the association for the said MAC address with the port in the forwarding table.

The mobility method may further include a process that the Ethernet frames delivered through the new path established after the mobile terminal is connected to a new wireless access point are buffered at the new wireless access point; the new wireless access point forwards to the final destination, i.e. the mobile terminal, the Ethernet frames whose source MAC addresses are the reflected MAC address RFA2 indicating that the Ethernet frames are retransmitted from the old wireless access point; the new wireless access point forwards the buffered Ethernet frames to their final destination, i.e. the mobile terminal, after the new wireless access point receives the retransmission-complete control signal for the said mobile node; the old access point to which the said mobile node lost connection generates the retransmission-complete control signal and sends it to the new access point after it retransmits all the Ethernet frames destined for the mobile node and temporarily buffered in the old wireless access point.

The mobility method may further include a process that the path-erase-downwards control signal is eventually delivered to the old wireless access point (actually an Ethernet switch) to which the said mobile terminal lost connection; the Ethernet frames destined for the said mobile terminal and delivered through the old path are temporarily buffered in the old access point; the old access point substitutes the source address of the buffered Ethernet frames with the reflected MAC address RFA2 that indicates the retransmitted frame from the old access point, and retransmits the buffered Ethernet frames through its root port toward the mobile node attached to a new access point when it receives the path-erase-downwards control signal; the old access point generates the retransmission-complete control signal when it finishes retransmitting all buffered Ethernet frames destined for the mobile node, and send it to the new access point using the MAC address of the new access point carried by the path-erase-downwards control signal; the Ethernet switch that receives the retransmitted Ethernet frame with RFA2 as the source address conducts the same forwarding procedure as it does for the normal Ethernet frames other than omitting the source learning.

The mobility method may further include a process that the forwarding data set by the control signals proposed in this invention are treated as the static data in the forwarding table which are not aged, and modified or deleted only with the control signals; if the data set to be aged, then the path-setup control signals should be periodically generated and sent to the network from the wireless access points to which the corresponding wireless nodes are attached.

The mobility method can be used along with the conventional functions of the Ethernet network and can be implemented by modifying the software, and thus is applicable to Ethernet networks that have already been installed.

The mobility method of the Ethernet switch may comprises receiving an Ethernet frame through a port of the Ethernet switch; and transmitting the Ethernet frame to an upper Ethernet switch through a root port of the Ethernet switch based on whether a forwarding information for a destination address of the Ethernet frame exists in a forwarding table.

Wherein when the upper Ethernet switch is a root switch, the root switch is configured to discard the Ethernet frame, or to change a source address of the Ethernet frame so that the source address represents a reflected frame at the root switch and to broadcast the Ethernet frame through designated ports, based on whether the forwarding information for the destination address of the Ethernet frame exists in the forwarding table.

The mobility method may further comprises: receiving an Ethernet frame with a source address representing a frame reflected from a root switch; omitting learning of the source address; and broadcasting the Ethernet frame with the source address representing the reflected frame through designated ports other than the root port, based on whether a forwarding information for a destination address of the Ethernet frame with the source address representing the reflected frame exists in the forwarding table.

The mobility method may further comprises: receiving a path-setup control signal comprising an Ethernet address of a mobile node and an Ethernet address of an access point which generates the path-setup control signal; recording the Ethernet address of the mobile node in the forwarding table and a port through which the path-setup control signal is received, as a forwarding port of an Ethernet frame whose destination address is the Ethernet address of the mobile node; and transmitting the path-setup control signal to the upper Ethernet switch through the root port.

The mobility method may further comprises: when the forwarding port exists in the forwarding table, updating the forwarding port to the port through which the path-setup control signal is received.

Wherein the transmitting of the path-setup control signal comprises, when the forwarding port exists in the forwarding table and is the port through which the path-setup control signal is received, transmitting the path-setup control signal.

The mobility method further comprises: when the forwarding exists in the forwarding table and is different from the port through which the path setting control signal is received, generating a path-erase-downwards control signal;

and transmitting the path-erase-downwards control signal to a lower Ethernet switch through the port which was set to forward the Ethernet frame destined for the mobile node before substituting the port with a new port, wherein the path-setup control signal is generated by an access point to which the mobile node is either attached for the first time or connected to through handover, wherein the path-erase-downwards control signal comprises the Ethernet address of the mobile node and an Ethernet address of the access point, and wherein the Ethernet frame destined for the mobile node are temporarily stored in a buffer of the access point during the handover.

Wherein when the upper Ethernet switch receiving the path-setup control signal is a root switch, the root switch is configured to record in a forwarding table of the root switch the port, through which the path-setup control signal is received, as the forwarding port of the Ethernet frame, whose destination address is the Ethernet address of the mobile node, and to stop forwarding the path-setup control signal.

The mobility method further comprises: receiving a path-erase-upwards control signal comprising an Ethernet address of a mobile node and an Ethernet address of an access point from which the mobile node is disconnected; and when a forwarding port of an Ethernet frame destined for the mobile node exists in the forwarding table, deleting the forwarding port from the forwarding table and transmitting the path-erase-upwards control signal to the upper Ethernet switch through the root port.

Wherein when the upper Ethernet switch receiving the path-erase-upwards control signal is the root switch, and when the forwarding port of the Ethernet frame destined for the mobile node, exists in a forwarding table of the root switch, the root switch is configured to delete the forwarding port from the forwarding table of the root switch and to stop forwarding the path-erase-upwards control signal.

Wherein the path-erase-upwards control signal is generated by the access point from which the mobile node is disconnected, and comprises the Ethernet address of the mobile node, and wherein the Ethernet frame destined for the mobile node is temporarily stored in a buffer of the access point.

The mobility method may further comprises: receiving a path-erase-downwards control signal comprising an Ethernet address of a mobile node and an Ethernet address of an access point to which the mobile node is connected through handover; when a port through which the path-erase-downwards control signal is received is a designated port, discarding the path-erase-downwards control signal; and when the port through which the path-erase-downwards control signal is received is the root port, transmitting the path-erase-downwards control signal to a lower Ethernet switch.

Wherein the transmitting of the path-erase-downwards control signal comprises, when an forwarding port for an Ethernet frame destined for the mobile node, exists in the forwarding table, transmitting the path-erase-downwards control signal through the forwarding port and deleting the forwarding port from the forwarding table.

Wherein the path-erase-downwards control signal further comprises an Ethernet address of a new access point to which the mobile node is connected through handover, wherein an Ethernet frame destined for the terminal is temporarily stored in a buffer of the new access point, wherein when an Ethernet frame, of which a source address is a special address indicating that is retransmitted from an old access point from which the mobile node is disconnected through handover, is received, the new access point is configured to forward the received Ethernet frame to the mobile node, wherein when a retransmission-complete control signal comprising the Ethernet address of the mobile node is received, the new access point is configured to transmit the Ethernet frame stored in the buffer to the mobile node, and wherein the retransmission-complete control signal is generated by the old access point.

Wherein the path-erase-downwards control signal is received by an old access point from which the mobile node disconnected during handover, wherein an Ethernet frame destined for the terminal is stored in a buffer of the old access point, wherein the old access point is configured to: replace a source address of the Ethernet frame stored in the buffer with an unique special address so that other Ethernet switches recognize that the Ethernet frame is retransmitted from the old access point to the mobile node with the source address; and transmit the Ethernet frame with the replaced source address to the mobile node after receiving the path-erase-downwards control signal; and generate a retransmission-complete control signal comprising the Ethernet address of the mobile node and transmit the retransmission-complete control signal to a new access point to which the mobile node is newly connected during the handover, after finishing transmission of the Ethernet frame stored in the buffer.

The mobility method may further comprises: receiving a retransmission-complete control signal comprising an Ethernet address of a mobile node; and transmitting the retransmission-complete control signal to a new access point using an Ethernet address of the new access point which is provided by a path-erase-downwards control signal, wherein the retransmission-complete control signal is generated by an old access point disconnected from the mobile node, and wherein the destination address comprises the Ethernet address of the new access point connected to the terminal by a handover.

The mobility method of the access point may comprises: generating a path-setup control signal comprising an Ethernet address of a mobile node when the mobile node is attached for the first time to the access point or is connected to the access point during handover; storing an Ethernet frame destined for the mobile node in a buffer; and transmitting the path-setup control signal to an Ethernet switch.

The mobility method of the access point may further comprises: when an Ethernet frame, of which a source address is replaced with a unique special address indicating that is retransmitted from an old access point to the mobile node, is received, transmitting the received Ethernet frame to the mobile node; and when a retransmission-complete control signal comprising the Ethernet address of the mobile node is received, transmitting the stored Ethernet frame to the mobile node, wherein the retransmission-complete control signal is generated by the old access point from which the mobile node is disconnected during handover.

The mobility method of the access point may further comprises: generating an path-erase-upwards control signal comprising the Ethernet address of the mobile node based on whether the access point is disconnected from the mobile node; and storing an Ethernet frame destined for the disconnected mobile node in the buffer.

The mobility method of the access point may further comprises: replacing a source address of the Ethernet frame destined for the disconnected terminal with an unique special address so that the other Ethernet switches recognize the Ethernet frame is retransmitted from the old access point to the mobile node; transmitting the Ethernet frame with the replaced source address to the disconnected mobile node which is moved and connected to a new access point; generating a retransmission-complete control signal comprising the Ethernet address of the disconnected mobile node; and transmitting the retransmission-complete control signal to the new access point connected to the terminal through handover, wherein a destination address of the retransmission-complete control signal comprises an Ethernet address of the new access point to which the mobile node is newly connected during handover.

Effect of the Invention

According to example embodiments, it is possible to realize a mobility for a seamless handover between Ethernet switches instead of processing a protocol in the Internet Protocol (IP) layer when a mobile terminal moves in an Ethernet network.

Also, according to example embodiments, it is possible to connect wireless Media Access Controls (MACs) to an Institute of Electrical and Electronics Engineers (IEEE) 802.1 Ethernet network based on the mobility of an Ethernet network proposed in this invention.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION FOR CARRYING OUT THE INVENTION

Figure 1:
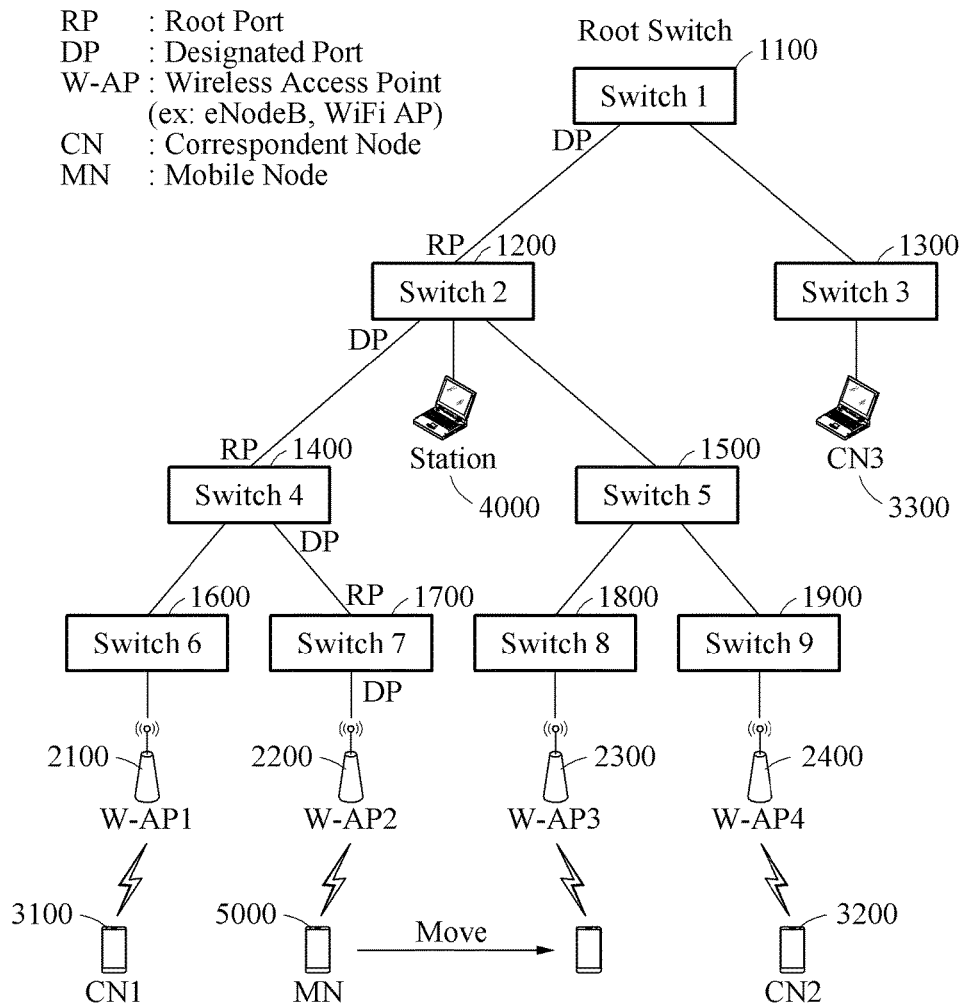
FIG. 1 is a diagram illustrating an Ethernet network according to an example embodiment.

Various modifications may be made to example embodiments. However, it should be understood that these embodiments are not construed as limited to the illustrated forms and include all changes, equivalents or alternatives within the idea and the technical scope of this disclosure.

The terminology used herein is for the purpose of describing particular example embodiments only and is not intended to be limiting of the example embodiments. As used herein, the singular forms are intended to include the plural forms as well, unless the context clearly indicates otherwise. It should be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood by one of ordinary skill in the art. Terms defined in dictionaries generally used should be construed to have meanings matching with contextual meanings in the related art and are not to be construed as an ideal or excessively formal meaning unless otherwise defined herein.

Regarding the reference numerals assigned to the elements in the drawings, it should be noted that the same elements will be designated by the same reference numerals, wherever possible, even though they are shown in different drawings. Also, in describing of example embodiments, detailed description of well-known related structures or functions will be omitted when it is deemed that such description will cause ambiguous interpretation of the present disclosure.

A concept of the present disclosure has been described in the "SUMMARY OF THE INVENTION". Hereinafter, example embodiments will be described in detail with reference to the accompanying drawings based on the described concept so that one of ordinary skill in the art may easily understand and implement the example embodiments.

When it is determined detailed description related to a related known function or configuration they may make the purpose of the present disclosure unnecessarily ambiguous in describing the present disclosure, the detailed description will be omitted here.

The following terminologies are defined in consideration of the functions in the example embodiments and may be construed in different ways by the intention, custom, etc. of users or operators. Therefore, the definitions thereof should be construed based on the contents throughout the specification.

Two new schemes are proposed to enable the mobility in Ethernet networks. First one is the new forwarding rule called "broadcasting at the root after searching upwards". While the current convention is either to discard or broadcast the frame when the lookup fails, the proposed scheme forwards the frame through the root port to search the path in the upper part of the spanning tree. If the lookup fails in all switches in upper part of the tree, the frame would reach the root switch. The root switch will finally broadcast if the lookup fails in the root switch too. Using this new forwarding rule, the frames are forwarded to the destination from any place of the network only if the path connecting the root and a mobile node is established. The second scheme is on the path control based on concept of "establishing a path only between the root switch and a mobile node". Four path control signals are proposed to maintain the proposed path for each mobile node in the environment that the mobile nodes frequently move around the network. Various mobile access networks and fazed access network can be merged into an Ethernet access network which is equipped with the mobility capability devised in this invention. The wireless or wireline nodes of different access network can move around the mobility enabled Ethernet access network maintaining the most efficient local communication path without resorting to IP mobility An example embodiment may provide an algorithm of "broadcasting in the root after searching upwards" for realizing a mobility in an Ethernet network, and four types of Bridge Protocol Data Units (BPDUs) as Ethernet switch protocols for dynamically establishing, discarding and changing the transmission paths of Ethernet frames in Ethernet networks. Based on the algorithm of "broadcasting in the root after searching upwards", when the destination address DA of a received Ethernet frame does not exist in the forwarding table of an Ethernet switch received the Ethernet frame, the Ethernet switch may forward the Ethernet frame to the upper Ethernet switch through the root port, and the upper Ethernet switch may search for the destination address in its forwarding table. Accordingly, the algorithm of "broadcasting in the root after searching upwards" may prevent an inefficiency caused by either discarding or broadcasting Ethernet frames when the forwarding table does not provide the port to forward Ethernet frames. Based on the algorithm of "broadcasting in the root after searching upwards", the Ethernet frame may finally reach the root switch when all the upper Ethernet switches fail to search for the destination address in their forwarding tables. When the destination address does not exist in the forwarding table, the root switch may broadcast the Ethernet frame through all ports including the port through which the Ethernet frame has entered. To prevent a confusion due to a source address (SA) learning for the broadcast Ethernet frames, the root switch may change the source address to the Reflected Frame Address RFA1 that is a unique MAC address assigned to all Ethernet frames reflected at the root switch, and may broadcast the Ethernet frames through all the designated ports.

The Ethernet switch may receive an Ethernet frame with the reflected frame address RFA1 as the source address. The Ethernet switch shall omit the source address learning process when the SA of the received Ethernet frame is RFA1. When the destination address of the Ethernet frame already exists in the forwarding table, the Ethernet switch may transmit the Ethernet frame based on a forwarding rule provided by the forwarding table. When the destination address of the Ethernet frame does not exist in the forwarding table, the Ethernet switch may broadcast the Ethernet frame through all designated ports. When the reflected Ethernet frame is received, an Ethernet switch shall not conduct the source address learning process and the Ethernet station shall ignore the source address. The algorithm of "broadcasting in the root after searching upwards" may minimize broadcasting of the Ethernet frame. Based on the algorithm of "broadcasting in the root after searching upwards", only the forwarding tables of Ethernet switches in the path between an Ethernet station and the root switch need to keep the forwarding port for the MAC address of the Ethernet station, while the current convention requires to keep that information in the forwarding tables of all the Ethernet switches in the Ethernet network. Also, a shortest path is generated to transfer Ethernet frames from any arbitrary location in the network to a destination Ethernet station. The algorithm of "broadcasting in the root after searching upwards" may minimize broadcasting Ethernet frames, updating the forwarding tables of Ethernet switches, time to set up or modify the path to reach Ethernet stations including mobile nodes.

An example embodiment provides four Ethernet switch control signals for "End-to-End (E2E) Path Control" to quickly set up, delete, and modify the transport paths for Ethernet frames. The embodiment also provides the buffering and retransmission schemes to avoid the loss of Ethernet frames during the handover process. According to the embodiment, the state that a Ethernet station is connected to or disconnected from the network is immediately reflected to the network, the path to reach the Ethernet station is also immediately established and deleted. The embodiment realizes the seamless handover by reducing the handover time and avoiding the frame loss during the handover. The embodiment enables the complete Ethernet transport by setting up the path only between an Ethernet station and the root switch. The complete Ethernet transport even with the configuration over the minimum number of Ethernet switches becomes feasible by employing a new frame forwarding scheme of "broadcasting in the root after searching upwards." The embodiment also enables to dynamically establish the shortest path for the mobile node moving around the network. The embodiment enables the low-delay no-loss communication over the Ethernet network even when the mobile nodes moves around and therefore changes the connection point to the network.

Another embodiment provides the method to integrate various access networks into the Ethernet network employing the Ethernet mobility described in the above embodiment. The various access networks include 3GPP RAN, IEE802 wireless MAC such as WLAN, and the wireline access network such EPON/GPON. The embodiments provides three schemes. The first scheme is to be applied to an IEEE802.11-based wireless MAC including Wireless Fidelity (WiFi), Worldwide Interoperability for Microwave Access (WiMAX), and connects the IEEE802.11 MAC wireless stations directly to the IEEE802.3 Ethernet network by mutually converting the MAC frames between IEEE802.11 and IEEE802.3. The second scheme is to be applied to the non-IEEE802 MACs including 3GPP MAC of a Long Term Evolution (LTE), and sets a constant relationship between the terminal IDs and IEEE802.3 MAC addresses. The third scheme is the overlay scheme of an "IEEE802.3 MAC over any wireless MAC" where the IEEE802.3 MAC frame is used as a Service Data Unit (SDU) over various wireless MACs, and accordingly the Ethernet layer is expanded over any arbitrary wireless MAC. The above three schemes enables for all types of wireless stations to be directly connected to the Ethernet network without terminating in the IP layer. Since the wireless stations are directly connected to the Ethernet network without being terminated in the IP layer, the Ethernet mobility implemented over the Ethernet network can uniformly applied to all terminals in various wireless and wireline access network by merging various access networks into an Ethernet network.

The example embodiments can be used along with the conventional functions of the Ethernet network and can be implemented by modifying the software, and thus is applicable to Ethernet networks that have already been installed.

FIG. 1 is an Ethernet network to describe an example embodiment.

Referring to FIG. 1, the Ethernet network has a tree topology with an Ethernet switch 1 1100 (hereinafter, referred to as the "root switch 1 1100") at the top. The Ethernet network includes the root switch 1 1100, an Ethernet switch 2 1200, an Ethernet switch 3 1300, an Ethernet switch 4 1400, an Ethernet switch 5 1500, an Ethernet switch 6 1600, an Ethernet switch 7 1700, an Ethernet switch 8 1800, and an Ethernet switch 9 1900. The Ethernet network is connected to fixed terminals 3300 and 4000 and mobile terminals 3100, 3200 and 5000. The mobile terminals 3100, 3200 and 5000 are connected to the Ethernet switch 6 1600 through the Ethernet switch 9 1900 through wireless Access Points, that is, a W-AP1 2100, a W-AP2 2200, a W-AP3 2300 and a W-AP4 2400. The W-AP1 2100 through the W-AP4 2400 may be, for example, various wireless RAN base stations, for example, a WiFi, a 3GPP eNodeB, a next generation 5th Generation (5G) AP, or a wireless network AP. The W-AP1 2100 through the W-AP4 2400 terminate the wireless link to mobile nodes in the network side. The W-AP1 2100 through the W-AP4 2400 may or may not have the Ethernet switch functionality in real wireless networks. FIG. 1 assumes that the W-AP1 2100 through the W-AP4 2400 have the Ethernet switch functionality without the loss of generality just for the convenience of description. Referring to FIG. 1, a mobile terminal MN 5500 is moving from the coverage area of W-AP2 2200 to that of W-AP3 2300 while maintaining a communication state with wireless terminals CN1 3100 and CN2 3200 and a wireline terminal CN3 3300. The mobile node MN 5500 requires to be handed over from the W-AP2 2200 to the W-AP3 2300. During the handover, the Ethernet network deletes an original path and establishes a new path for MN 5500. In this example, the W-AP2 2200 is the old wireless access point that terminates the original path and the W-AP3 2300 is the new wireless access point that terminates the new path.

Figure 2:
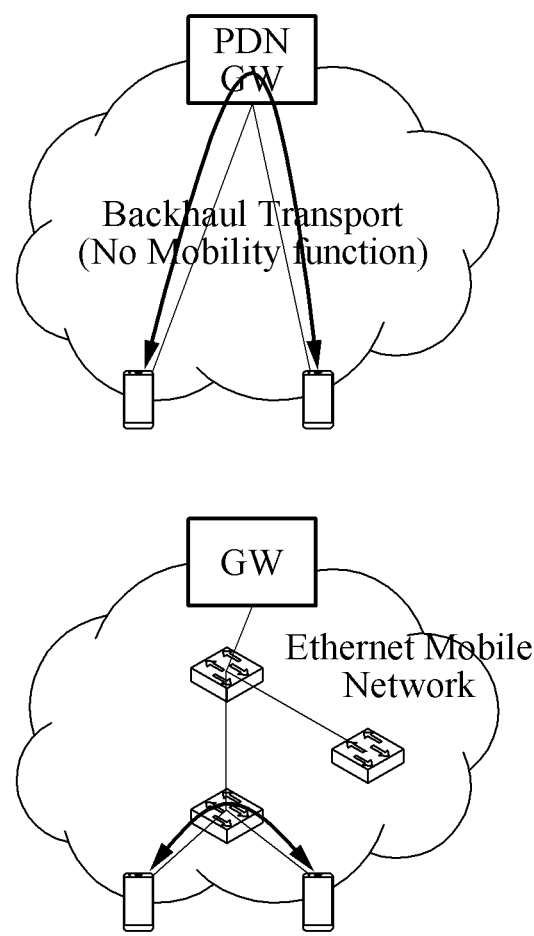
FIG. 2 is a diagram illustrating a cell-based mobile communication network and an Ethernet network according to an example embodiment.

FIG. 2 is a diagram illustrating a cell-based mobile communication network and an Ethernet network according to an example embodiment.

Referring to FIG. 2, in the cell-based mobile communication network, all communication paths are established on the IP layer and therefore should be terminated at Packet Data Network (PDN) Gateway (PGW) which works as the IP anchor, and accordingly all traffic need to pass through the PGW resulting in the traffic bottleneck at the POW. Therefore, the core transport network unnecessarily suffers from a large amount of traffic loads, and the propagation time is increased due to a long transmission path. However, the good feature of the cell-based mobile communication network is that the communication path is established or modified by configuring the corresponding data at only a few points in the network, for example, a PGW, a Serving Gateway (SGW), an eNodeB. It is very effective to realize a fast and seamless handover required for the mobile network.

FIG. 2 illustrates a case that communication paths are established through the Ethernet networks. If the handover procedure for mobile nodes are fully contained within the Ethernet network without resorting to modification in the IP network nodes, the most efficient path would be established resulting in the reduction of the traffic load in the core network and the minimization of the propagation delay. Especially, the characteristics of the low propagation delay is indispensable for Vehicle-to-Infrastructure (V2I) that requires a short delay time. This invention proposes a mobility functionality for the Ethernet network so that the modification of communication paths required when mobile nodes move around the network can be contained within the Ethernet network. The mobility method of this invention also keeps the number of network elements affected by the handover to be minimum as the current cell-based mobile network does, and therefore enables the fast seamless handover in Ethernet networks.

Figure 3:
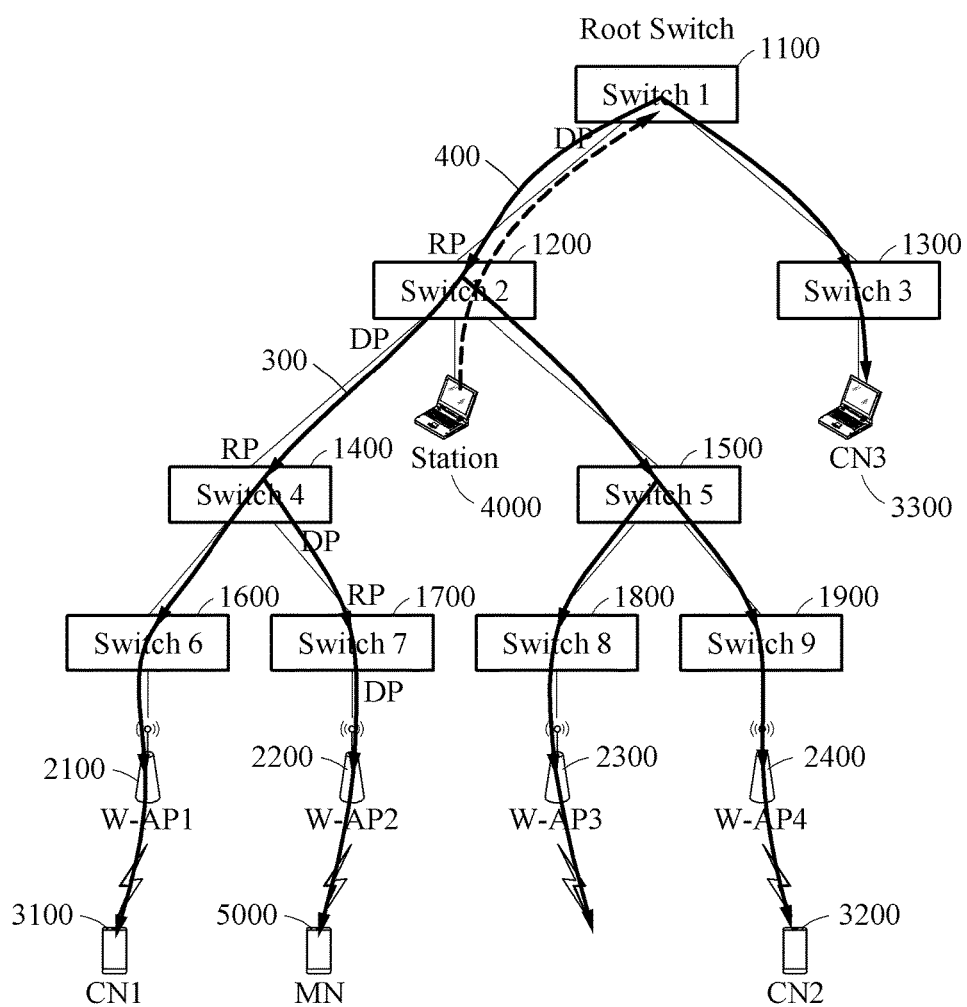
FIG. 3 is a diagram illustrating a mobility method for an Ethernet network according to an example embodiment.

FIG. 3 illustrates the said mobility method for Ethernet networks according to an example embodiment.

The Ethernet network may provide a mobility based on an algorithm of "broadcasting in a root after searching upwards" and an algorithm of "establishing a path only between a mobile node and the root switch." The current convention for forwarding Ethernet frame in Ethernet switch is based on learning the source address, looking up the destination address in the forwarding table, and either broadcasting or discarding Ethernet frames when there is no matched information for the destination address in the forwarding table (will be called as "look-up failure" hereinafter). In this invention description, we will use both frame and packet to indicate Ethernet frame. The nouns "frame", "packet", "Ethernet frame" used in this description are all indicate "Ethernet frame".

According to the algorithm of "broadcasting in the root after searching upwards", an Ethernet switch forwards a received Ethernet frame through the root port when there is look-up failure, to continue searching for a destination path in the Ethernet switches located in the upper part of the spanning tree. If there is an information matched for the destination address of the Ethernet frame in the forwarding table of an Ethernet switch, then the Ethernet switch should forward the Ethernet frame through the port indicated by the forwarding table. When there is no Ethernet switch that have the matched information, then the Ethernet frame will be finally delivered to the root switch. The root switch also looks up the destination address in its forwarding table. If there is a matched information, then it should forward the frame through the port indicated by the forwarding table. If not, the root switch should substitute the source address of the frame with a special MAC address, RFA-1 indicating that the frame is reflected from the root switch, and should then broadcast the frame through all designated ports. The Ethernet switches that receive the Ethernet frame whose source address is RFA-1 shall omit the source address learning and look up the destination address in their forwarding table. If there is matched information, then the frame should be forwarded through the port indicated by the forwarding table. Otherwise, the Ethernet switch shall broadcast the frame through all designated ports.

To describe the algorithm of "broadcasting in the root after searching upwards", referring to FIG. 3, an Ethernet station 4000 as a fixed terminal may transmit an Ethernet frame, and an Ethernet switch 2 1200 receives the frame. The Ethernet switch 2 1200 looks up the destination address of the frame in its forwarding table. If there is a matched information, then the frame should be forwarded through the port indicated by the forwarding table. Otherwise, the frame should be forwarded to switch 1 1100 through the root port (RP). FIG. 3 depicts the case of look-up failure. The dotted line indicates the path through which the frame is forwarded in the case of look-up failure at switch 2. The switch 1 in FIG. 3 is the root switch. The root switch 1 1100 may determine whether the forwarding information for the destination address of the received Ethernet frame exists in the forwarding table. The root switch also looks up the destination address in its forwarding table. If there is a matched information, then the frame should be forwarded through the indicated port. The root switch 1 1100 may broadcast the Ethernet frame through designated ports when the forwarding information does not exist. FIG. 3 depicts the case that the root switch does not have the matched information. The root switch replaces the source address of the frame with RFA-1 and then broadcasts the frame through all designated ports which are two in FIG. 3. The frame broadcast by the root switch is delivered to switch 2 1200, and switch 3 1300. The switch 2 and the switch 3 can tell the frame is reflected from the root switch with the source address of RFA-1. They omit the source learning procedure and look up the destination address in their forwarding table. If there is a matched information, then the frame should be forwarded as directed by the forwarding table. Otherwise, the frame is broadcast through all designated ports. FIG. 3 depicts the case that all the switches does not have the matched information. The frame is broadcast at all switches through all designated ports of each switch. The solid lines in FIG. 3 show the paths that the frame is broadcast downwards to all switches and all Ethernet stations.

When the Ethernet frame is broadcast by the root switch 1 1100, lower Ethernet switches, that is, the Ethernet switch 2 1200 and an Ethernet switch 3 1300 may receive the Ethernet frame. When the Ethernet frame is reflected and broadcast from the root switch 1 1100 to the Ethernet switch 2 1200 through an Ethernet switch 9 1900 through the RP, and when the destination address of the received Ethernet frame is not recorded in forwarding tables, the Ethernet switch 2 1200 through the Ethernet switch 9 1900 may broadcast the Ethernet frame through all Designated Ports (DP). When the Ethernet frame is received through the DPs from the root switch 1 1100, the Ethernet switch 2 1200 through the Ethernet switch 9 1900 may discard the received Ethernet frame. The root switch 1 1100 may change a source address of the Ethernet frame for broadcasting. An example of changing the source address will be described with reference to FIG. 4 below.

Figure 4:
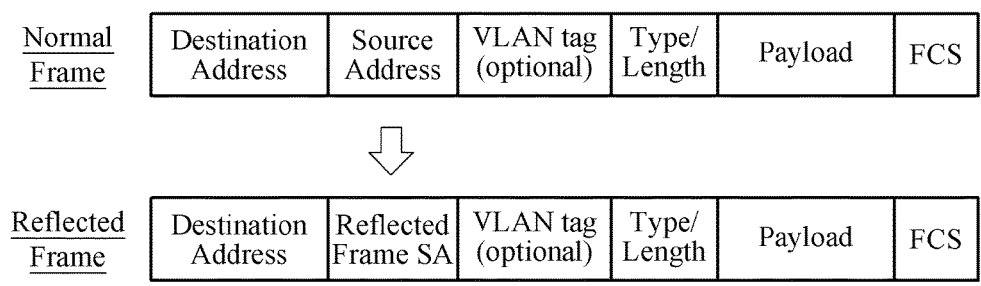
FIG. 4 is a diagram illustrating an operation of modifying the source MAC address of an Ethernet frame according to an example embodiment.

FIG. 4 illustrates the reflected Ethernet frame according to an example embodiment.

Referring to FIG. 4, an example embodiment may replace the source address of the Ethernet frame with special MAC addresses assigned to represent that the frame has been reflected at a certain network node. According to the mobility method proposed in this invention, two types of network elements can replace the source address. Firstly, the root switch can replace the source address with RFA-1 when it reflects a frame delivered from the other switch into the network through the designated ports. Secondly, the wireless or wireline access point can replace the source address with RFA-2 when it retransmits into the network the frames temporarily buffered in it. The Ethernet switches shall omit the source address learning when the source address is one of the reflected frame source addresses.

The root switch 1 1100 may change the source address to a specific address, for example, a Reflected Frame Address RFA to which the reflected frame is assigned. The root switch 1 1100 may broadcast the Ethernet frame with the changed source address through all designated ports. For example, when a source address of a received Ethernet frame is a Reflected Frame Address RFA, an Ethernet switch may omit learning of the source address. An Ethernet network according to an example embodiment may prevent a confusion of processing of a forwarding table by a reflected Ethernet frame by employing a scheme of changing a source address.

The Ethernet mobility proposed in this invention is based on the communication path control for each mobile node, which includes the establishment, deletion, and modification of the path. The Ethernet switch needs to maintain the data related to the path as the static entries that are not aged out. If the Ethernet switch treats the data as the dynamic entries that undergo the aging-out, then the path control signals, particularly the path-setup control signal, should be periodically generated and sent to keep the path active and valid. Either of these two methods may be applied for the treatment of the path data for mobile nodes.

The path control signals for Ethernet mobility are implemented by four types of BPDUs, which are protocols between Ethernet switches. Four control signals are defined as shown in Table 1.

TABLE 1

|  | path-setup | path-erase-upwards | path-erase = downwards | retransmission-complete |
| --- | --- | --- | --- | --- |
| Generation | access point (Ethernet switch) that just connected to a mobile node | access point (Ethernet switch) just disconnected from a mobile node | Ethernet switch where the old path and the new path meet | The old access point disconnected from a mobile node |
| Messages in the control signal | Ethernet address of the mobile node; Ethernet address of the access point | Ethernet address of the mobile node | Ethernet address of the mobile node; Ethernet address of the new access point | Ethernet address of the mobile node |
| Destination address | a specific address assigned for Ethernet mobility control BPDU | a specific address assigned for Ethernet mobility control BPDU | a specific address assigned for Ethernet mobility control BPDU | Ethernet address of the new access point |
| Action of the Ethernet | Updates forwarding table for Ethernet | Erases forwarding | Looks up and erases the Ethernet address | Forwards the control signal according to the |

TABLE 1-continued

| | path-setup | path-erase-upwards | path-erase = downwards | retransmission-complete |
|---|---|---|---|---|
| switch receiving the control signal | address of mobile node; Forwards the control signal through the root port | information for Ethernet address of mobile node; Forwards the control signal through the root port | of the mobile node in the forwarding; Forwards the control signal through the erased port | destination address of the control signal, which is the Ethernet address of the new access point |
| Action of the Ethernet switch at termination point of the control signal | Stops forwarding the control signal | Stop forwarding the control signal | Records the Ethernet addresses of the mobile nodes and the new access point; Stops forwarding the control signal; Forwards the buffered frames destined for the mobile node | Recognizes that there is no more frame to be retransmitted from the old access point; Forwards the frames stored in its buffer to the mobile node |
| Termination of the control signal | Either the root switch or an Ethernet switch where the old path and the new path meet | Either the root switch or an Ethernet switch where the old path and the new path meet | the old access point disconnected from the mobile node | The new access point to which the mobile node newly connected |

The path for a mobile node is established and maintained according to the new scheme proposed in this invention, which is called "establishing a path only between a mobile node and the root switch". Table 1 summarizes the four bridge protocols as a means to implement the path control signaling between Ethernet switches. This invention does not exclude any other means as far as it implements the scheme of "establishing a path only between a mobile node and the root switch".

The path-setup control signal and the path-erase-upwards control signal are used to dynamically establish and delete paths for mobile nodes, respectively.

The path-setup and the path-erase-downwards are used to switch the path for a mobile node from an old path to a new path during the handover. The retransmission-complete control signal is used to notify the new access point, to which the mobile node is newly connected, that there will be no more frame to be retransmitted from the old access point, from which the mobile node just disconnected. This control signal enables the lossless transmission during the handover, together with three other correlated actions, which includes buffering the frames both at the old and the new access points, retransmitting frames at the old access, and forwarding the frames buffered at the new access point. The correlated operation of the control signals are described in the following paragraph.

When a mobile node gets initially attached to the network, the access point to which the mobile node gets attached generates the path-setup control signal that carries the Ethernet address of the mobile node in its message. The path-setup control signal is forwarded through the root port to the Ethernet switch in the upper part of the spanning tree. The Ethernet switch receiving the control signal recognizes that the mobile node can be reached through the port that the path-setup control signal has arrived. The switch writes this forwarding information in the forwarding table and forwards the path-setup control signal through the root port to the next upper Ethernet switch. The next upper switch also conducts the same procedures. The path-setup control signal will then eventually be forwarded to the root switch. The Ethernet switches located in the path connecting the mobile node to the root switch will have the forwarding data for frames destined for the mobile node. The root switch also writes the forwarding information in its forwarding table and stops forwarding the path-setup control signal. The establishment of a shortest path between the root switch and the mobile node has been completed.

When a mobile node is detached from the network, the access point from which the mobile network is being detached generates the path-erase-upwards control signal and sends it through the root port. The Ethernet switch receiving the path-erase-upwards control signal recognizes that the mobile node reachable through the port that the control signal has arrived is not reachable any more. The switch erase the corresponding forwarding data in its forwarding table and forwards the path-erase-upwards control signal through the root port to the next upper Ethernet switch. The next switch also conducts the same procedure as the previous switch does. The path-erase-upwards control signal will eventually reach the root port erasing the path established from the root port and the mobile node. The root port also erases the forwarding data for the mobile node and stops forwarding the control signal.

When a mobile node moves from the coverage area of one access point (called the old access point hereinafter) to that of another access point (called the new access point hereinafter), the new access point generates a path-setup control signal and sends it through the root port to the upper Ethernet switch. The path-setup control signal then establishes a new forwarding path connecting from the root switch to the mobile node as described above. During this new path setup process, an Ethernet switch where the old path and the new path meets shall generate a path-erase-downwards control signal and send it through the port corresponding to the old path. The lower Ethernet switch receiving the path-erase-downwards erases the forwarding data for the old path in its forwarding table and forwards the control signal through the port for the old path further into the lower Ethernet switch. The path-erase-downwards control signal will eventually be delivered to the old access point. The old access point recognizes that the new path for the mobile node has been established by receiving the path-erase-downwards control signal. The old access point has stored the frames that were arrived after the mobile node was disconnected. The old access point retransmits all these buffered frames to the mobile node through the root port. The old switch replaces the source addresses of the retransmitted frames with a reflected frame source address RFA-2 before it retransmits the frames. After completing the retransmission, the old access point generates a retransmission-complete control signal and sends it to the new access point. The new access point buffers the frames delivered through the new path and waits for the retransmission frames. When the retransmission frames arrive, the new access point recognizes the retransmission frames with their source address of RFA-2 and then forwards them to the mobile node. When the retransmission-complete control signal arrives, the new access point recognize that there will be no more frames retransmitted from the old access point. The new access point then forwards the frames stored in its buffer to the mobile node. The lossless handover is then completed. The procedures of buffering, retransmission, and retransmission-complete signaling are not conducted when the mobile node allows the lossy handover.

The source address of BPDUs for Ethernet mobility signal is the Ethernet address of the Ethernet switch which generates the BPDU. The destination address of BPDUs is a specific multicast address assigned for the Ethernet mobility. It should be assigned by a standard development organization. The destination address of the BPDU for retransmission-complete is the Ethernet address of the new access point.

Figure 5:
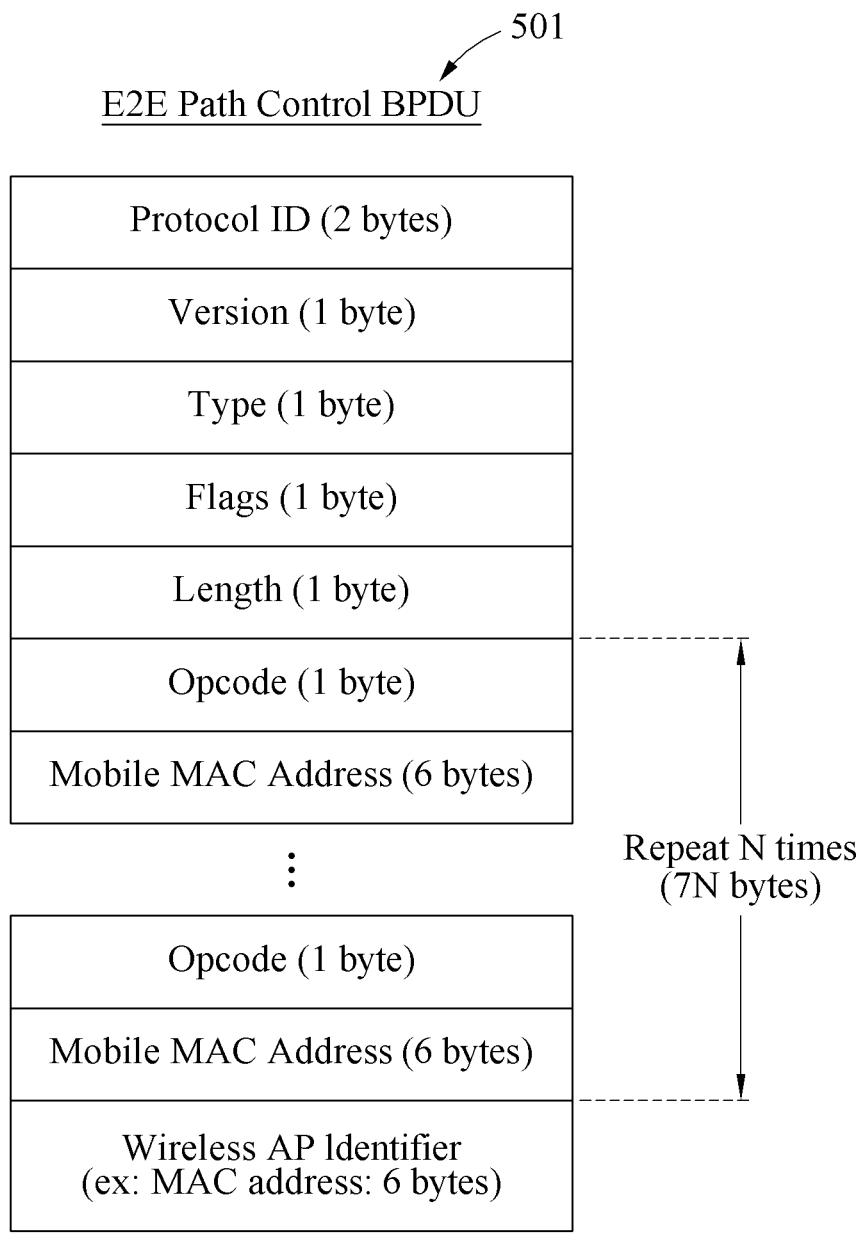
FIG. 5 is a diagram illustrating an example of an Ethernet frame for a control signal according to an example embodiment.

FIG. 5 illustrates an example of an E2E path control BPDU frame structure for Ethernet mobility control signals according to an example embodiment.

For an E2E Path Control BPDU, a new Protocol ID may be assigned by a standard development organization. For example, the BPDUs for spanning protocol are assigned to use "0X0000" for their protocol ID. The Version field is for displaying a version of the protocol for coexistence and interoperability between protocols of various versions. The Type field is used to identify the above-described four control signals. The Flags field is used to indicate a specific state information of each control signal, for example, indicating whether the control signal is a request or a response. The Flags may be used to indicate whether a path-setup control signal and a path-erase-upwards control signal are forwarded up to the root switch, or are terminated at an Ethernet switch where the old path and the new path meet. A Length field indicates a length of the control signal messages.

Referring to FIG. 5, a unit of a single control message includes an opcode and an Ethernet address of a mobile node, and N units of control messages may be encapsulated in a single BPDU reducing the number of BPDUs. The path-setup signals and the path-erase-upwards signals can be encapsulated together in a single BPDU. Considering the case that the multiple mobile nodes are attached, or handed on/off, or detached, simultaneously from the same access point, it is efficient to encapsulate all these messages into a single BPDU. The messages structure in FIG. 5 enables the encapsulation of multiple messages for different control signals into a single BPDU. The opcode indicates whether the corresponding message is for the path-setup or path-erase-upwards. The retransmission-complete control signals should be encapsulated in a separated BPDU. The opcode in this PBDU always set to indicate that the messages are for retransmission-complete signal. The wireless AP identifier field indicates the Ethernet address of the access point that generates the control signals.

Figure 6:
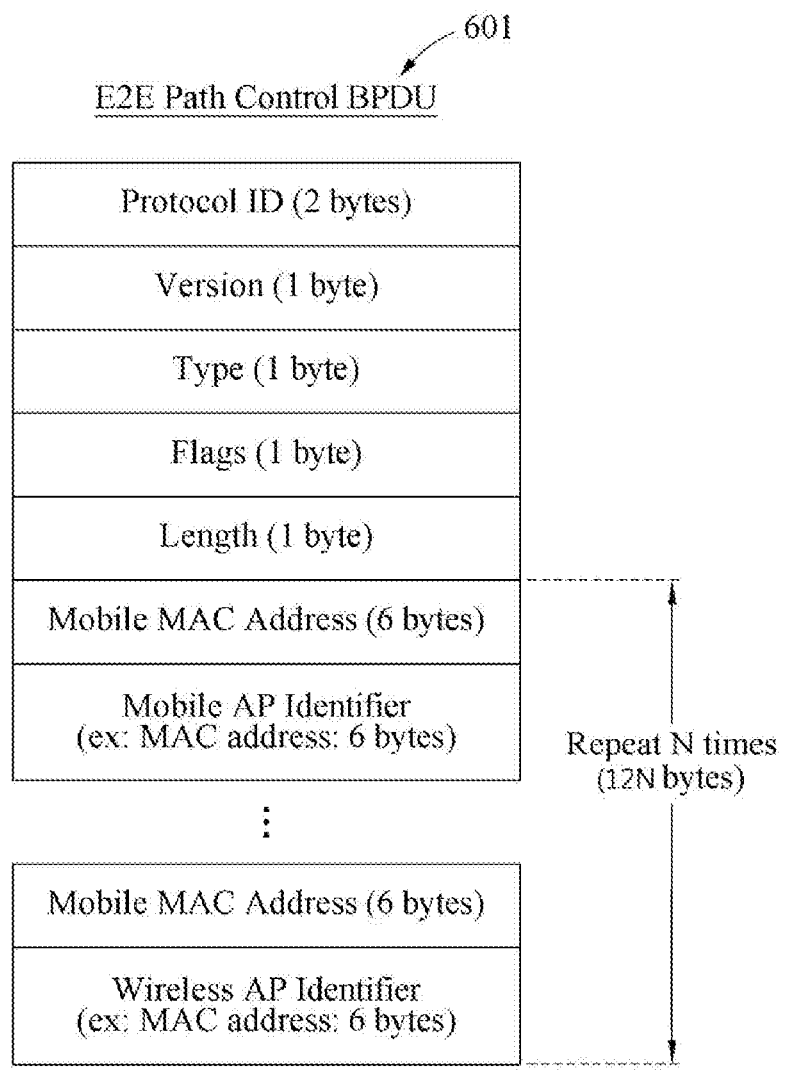
FIG. 6 is a diagram illustrating another example of an Ethernet frame for a control signal according to an example embodiment.

FIG. 6 illustrates another example of an E2E path control frame structure for Ethernet mobility control signals according to an example embodiment.

The frame structure of FIG. 6 is applied to the path-erase-downwards control signal. Based on the frame structure of FIG. 6, a unit of control message includes an Ethernet address of a mobile node and an Ethernet address of the new access point and N units of the control messages may be encapsulated into a single BPDU.

The frames structures of FIGS. 5 and 6 are merely examples, and are not limited. Accordingly, an Ethernet network may be implemented by employing another frame structure.

The basic operation of Ethernet mobility based on "broadcasting at the root switch after searching upwards" and "establishing a forwarding path only between a mobile node and the root switch" has already been described. The operation of four forwarding path control signals has been explained and BPDUs as a means to implement the control signals has also been explained. In the following paragraph, all the operations are described again using a simplified Ethernet network model.

Figure 7:
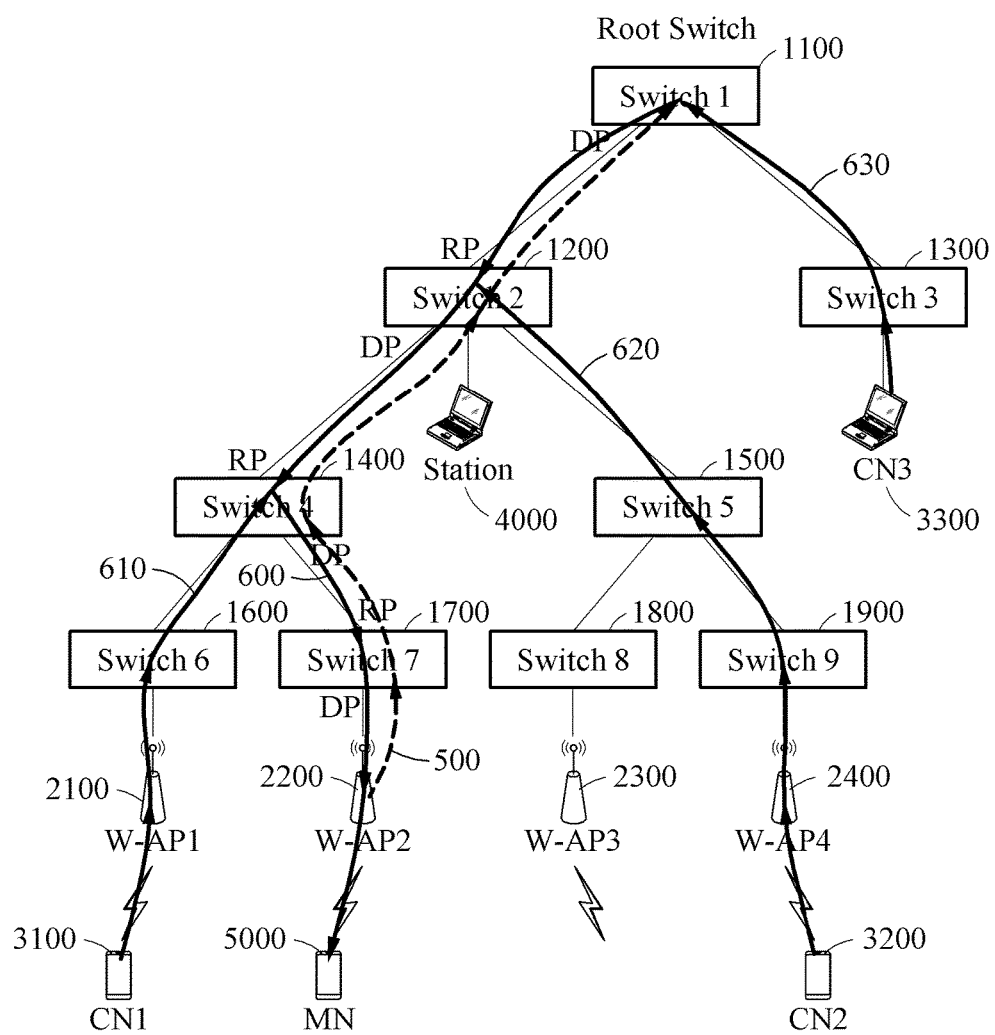
FIG. 7 is a diagram illustrating an operation of an Ethernet network according to an example embodiment.

FIG. 7 illustrates an operation of the setup and deletion of the forwarding path according to an example embodiment.

Referring to FIG. 7, a mobile terminal MN 5000 sets up an wireless link with a W-AP2 2200, and has W-AP2 to establish a forwarding path up to a root switch 1100. A path 500 indicated by a dashed line in FIG. 7 is the forwarding path. A path 610 indicated in a solid line (3100-2100-1600-1400-1700-2200-5000) is the path through which Ethernet frames from a CN1 3100 are forwarded to the MN 5000. A path 620 indicated in a solid line (3200-2400-1900-1500-1200-1400-1700-2200) is the path through which Ethernet frames from a CN2 3200 are forwarded to the MN 5000. A path 630 indicated in a solid line (3300-1300-1100-1200-1400-1700-2200) is the path through which Ethernet frames from a CN3 3300 are forwarded to the MN 5000 may be.

Based on an algorithm of "broadcasting in a root after an upward search" according to an example embodiment, when Ethernet frames transmitted from each of CN1 3100, CN2 3200 and CN3 3300 to the MN 5000 are received by an Ethernet switch, the Ethernet switch looks up the destination address in its forwarding table. When there is no matched information for the destination address, the Ethernet address of mobile node in this case, the Ethernet switch forwards the received Ethernet frames through the root port. When the Ethernet frames meet any Ethernet switch in the path 500 during searching upwards, the Ethernet switch forwards the Ethernet frames through the port indicated by the forwarding table. The Ethernet frames are then forwarded along the path 500 and finally reaches MN 5000 at the end of path 500.

Figure 8:
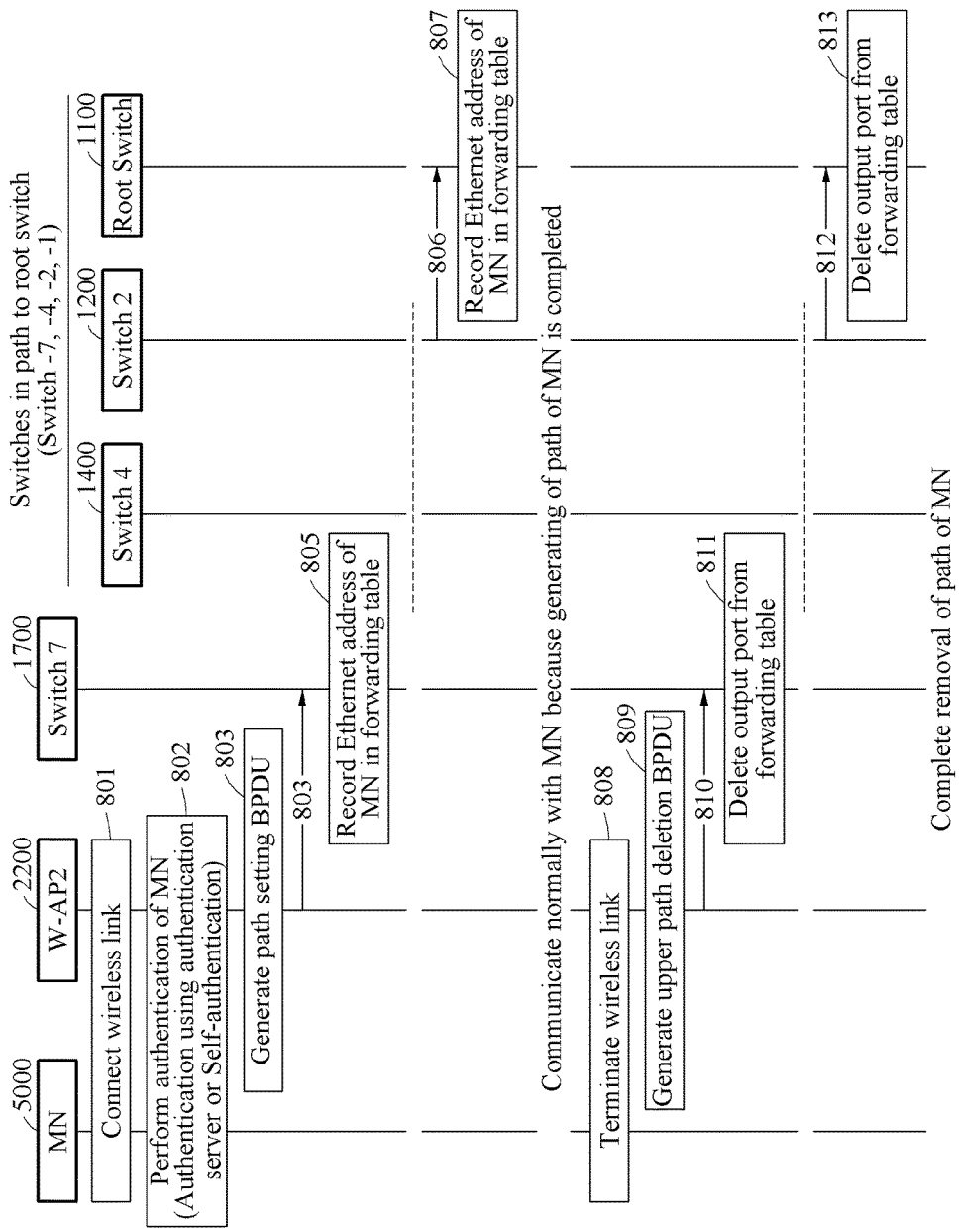
FIG. 8 is a flowchart illustrating a path set-up and an upwards path erasure according to an example embodiment.

FIG. 8 is a flowchart illustrating the path-setup and the path-erase-upwards according to an example embodiment.

Referring to FIG. 8, in operation 801, MN 5000 sets up a wireless link to W-AP2 2200. W-AP2 2200 becomes an access point for MN 5000. When the wireless link is established between MN 5000 and W-AP2 2200, authentication of MN 5000 may be performed in operation 802. The authentication may be performed using an authentication server or self-authentication may be performed.

When W-AP2 2200 is connected to MN 5000, a path-setup BPDU including an Ethernet address of MN 5000 is generated in operation 803. MN 5000 is either connected for the first time or connected by handover to W-AP2 2200. In operation 804, W-AP2 2200 transmits the path-setup BPDU to an upper Ethernet switch, for example, Ethernet switch 7 1700, through the root port (RP). In operation 805, Ethernet switch 7 1700 registers the forwarding data for the Ethernet address of MN 5000 in a forwarding table. The forwarding data means that the port which the path-setup control signal enters is the port through which the Ethernet frames destined for MN 5000 should be forwarded.

Ethernet switch 7 1700 forwards the path-setup BPDU to an upper Ethernet switch, for example, an Ethernet switch 4 1400, through the RP. Switch 4 1400 and switch 2 1200 also conduct the same procedures as switch 7 1700 does and the path-setup BPDU eventually reaches the root switch 1100. The root switch 1100 registers the forwarding information for the Ethernet address of MN 5000 in its forwarding table in operation 807. The root switch stops forwarding the path-setup BPDU.

In operation 808, MN 5000 detached from W-AP2 2200 and W-AP2 2200 becomes an access disconnected from MN 5000. When W-AP2 2200 is disconnected from MN 5000, a path-erase-upwards BPDU including the Ethernet address of MN 5000 is generated in operation 809. In operation 810, W-AP2 2200 transmits the path-erase-upwards BPDU to Ethernet switch 7 1700 through the RP.

When switch 7 1700 receives the path-erase-upwards BPDU, the Ethernet switch 7 1700 erases the forwarding data for MN 5000 in the forwarding table in operation 811. Ethernet switch 7 1700 forwards the path-erase-upwards BPDU to Ethernet switch 4 1400 through the RP. Through the same scheme, in operation 812, the path-erase-upwards BPDU is finally delivered to the root switch 1100. The root switch 1100 erases the forwarding data for MN 5000 in the forwarding table in operation 813. The root switch 1100 stops forwarding the path-erase-upwards BPDU.

As described above, the establishment and deletion of a path for a mobile node are accomplished by registering and deleting the forwarding information for the Ethernet address of the mobile node MN 5000 in the forwarding tables of the Ethernet switches in the path connecting between the mobile node MN 5000 and the root switch 1100, respectively. The forwarding information are maintained either as a fixed entry (not deleted by aging-out) or a dynamic entry (deleted by aging-out). If the forwarding information is treated as a fixed entry in the Ethernet switch, then a single path control signaling would be enough to set and maintain the state of the path. If it is treated as a dynamic entry, then the periodic path control signaling would be required to maintain the state of the path. The scheme of the dynamic entry is advantageous in the case that the topology of the Ethernet network is changed.

During the path establishment process with the path-setup control signal, the Ethernet switch receiving the path-setup signal might have the forwarding information set up for the Ethernet address of the mobile node. If the port indicated by the information is the same as the port that the control signal enters, then the Ethernet switch would just forward the control signal to the next Ethernet switch. If the port indicated by the forwarding information is different from the port that the path-setup control signal enters, then the Ethernet switch generates a path-erase-downwards control signal and send it to the port indicated by the forwarding information to clean up the other probable incorrect forwarding information in the Ethernet switches in the downstream.

During the path deletion process with the path-erase-upwards control signal, the Ethernet switch receiving the path-erase-upwards signal might have the incorrect forwarding information indicating the incorrect port as the forwarding port for the mobile node. The Ethernet switch should then generate a path-erase-downwards control signal and send it to the port indicated by the forwarding information to clean up the other probable incorrect forwarding information in the Ethernet switches in the downstream. The path-erase-upwards control signal is forwarded to the next upper Ethernet switch through the root port.

Figure 9:
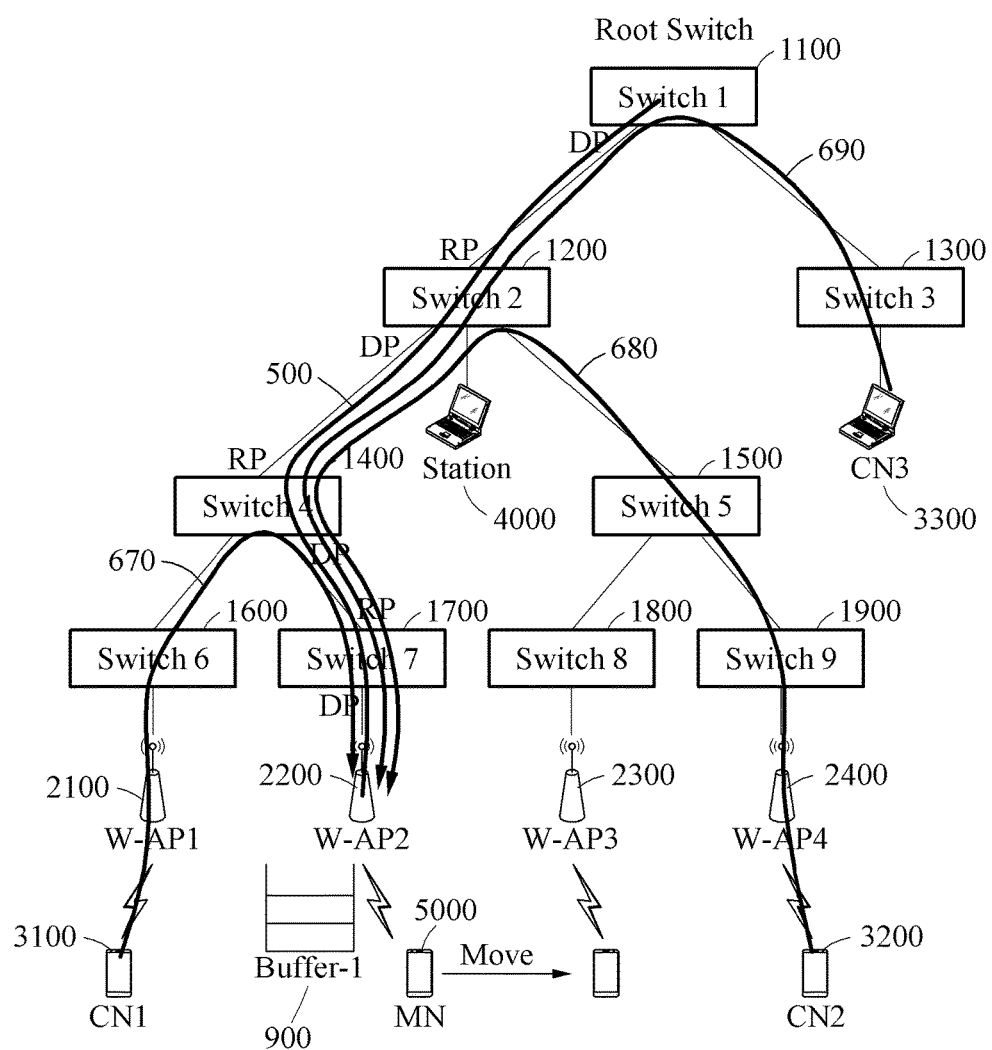
FIG. 9 is a diagram illustrating an example of an operation of an Ethernet network according to an example embodiment.
Figure 10:
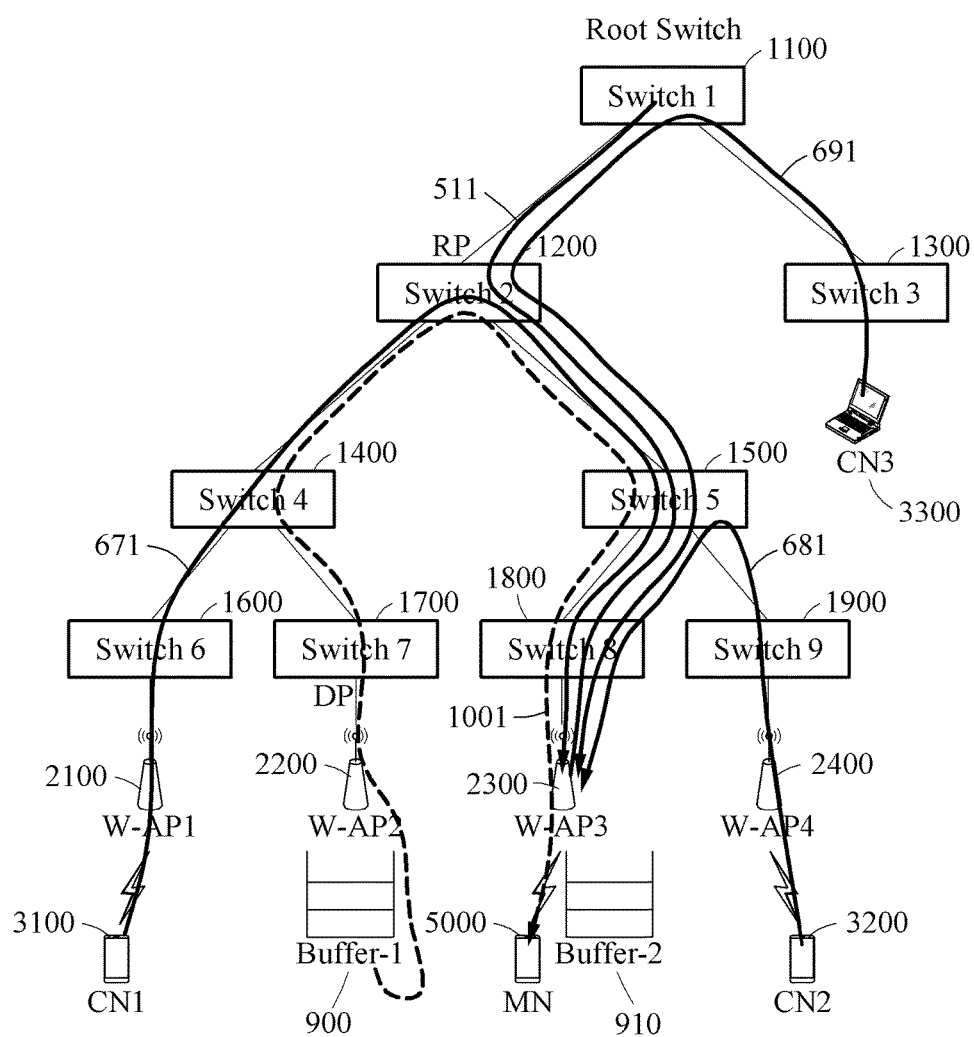
FIG. 10 is a diagram illustrating another example of an operation of an Ethernet network according to an example embodiment.
Figure 11:
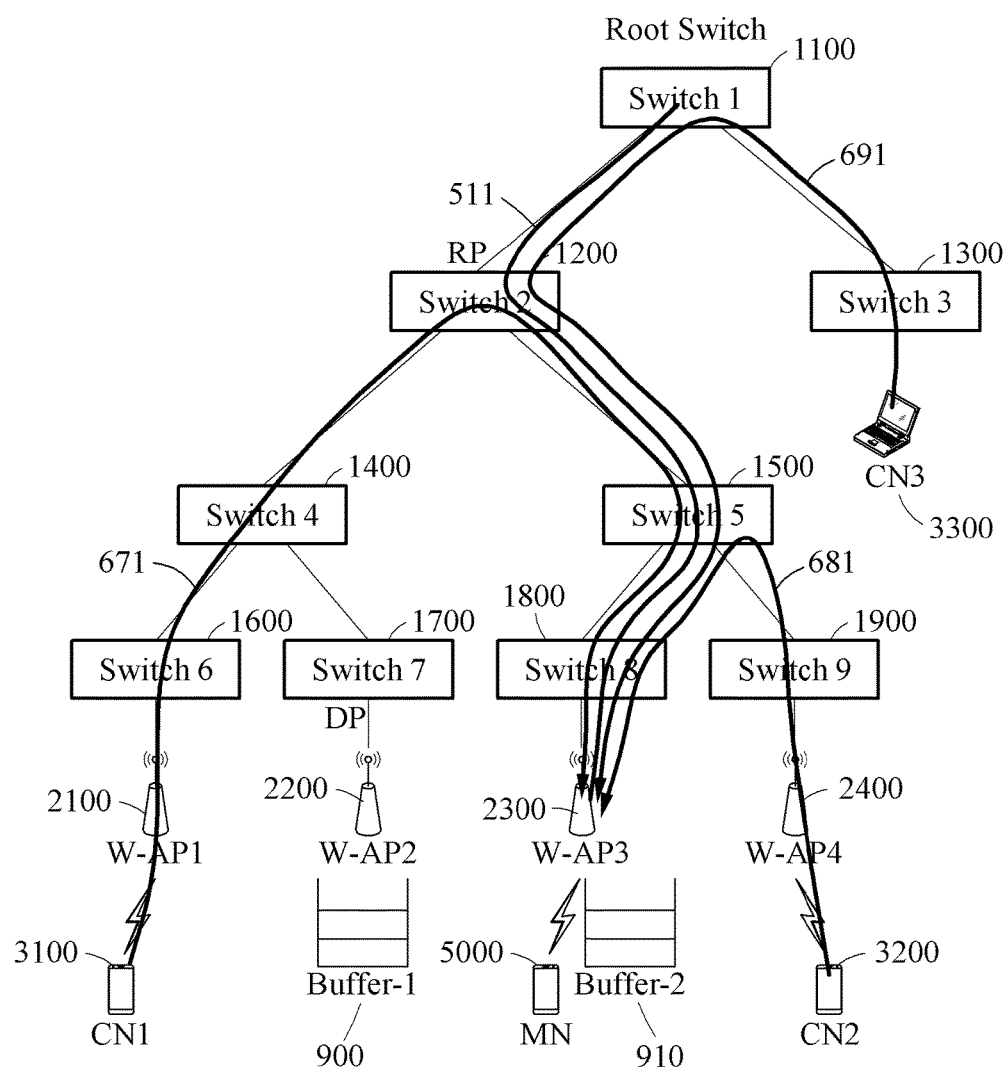
FIG. 11 is a diagram illustrating another example of an operation of an Ethernet network according to an example embodiment.
Figure 12:
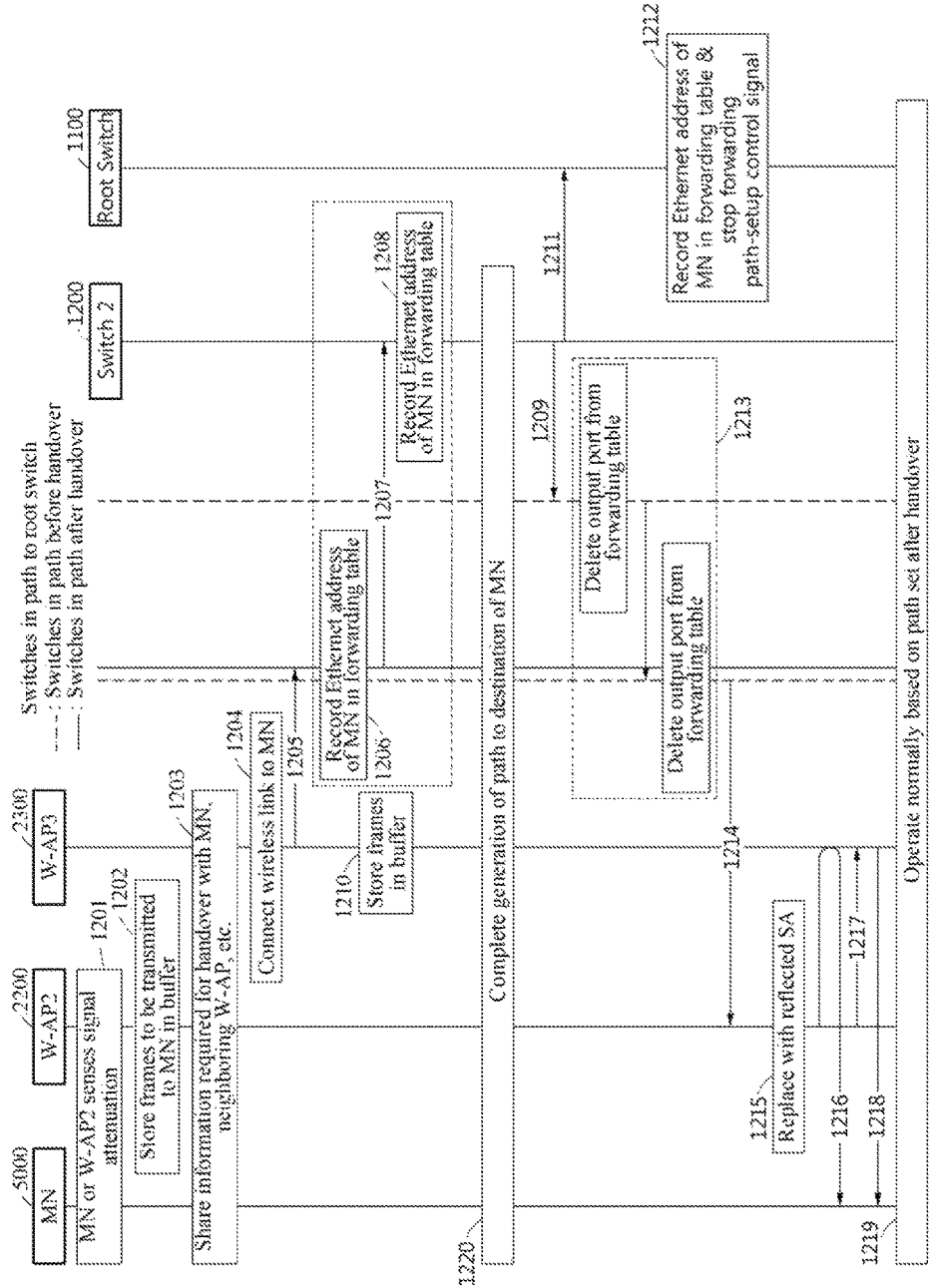
FIG. 12 is a flowchart illustrating an upwards path erasure, a path set-up, a downwards path erasure and a retransmission completion according to an example embodiment.

Hereinafter, examples of performing a handover will be described with reference to FIGS. 9, 10, 11 and 12. FIGS. 9, 10 and 11 illustrate examples of the handover procedures for Ethernet networks according to an example embodiment. FIG. 12 is a flowchart illustrating path control procedures required to support the lossless handover, which include path-erase-upwards, path-setup, path-erase-downwards, and retransmission-complete according to an example embodiment.

Referring to FIG. 9, MN 5000 and W-AP2 2200 may be disconnected from each other, when a wireless signal attenuation is sensed by MN 5000 or W-AP2 2200 in operation 1201 of FIG. 12. In operation 1202 of FIG. 12, W-AP2 2200 stores in buffer-1 900 Ethernet frames destined for MN 5000. The Ethernet frames stored in buffer-1 900 may include Ethernet frames transmitted from a CN1 3100 along path 670, Ethernet frames transmitted from a CN2 3200 along path 680, Ethernet frames transmitted from a CN3 3300 along path 690, and Ethernet frames transmitted from the root switch 1100 along path 500. The scheme of "broadcasting at the root switch after searching upwards" is applied as the forwarding rule for the delivery of frames up to W-AP2 2200. The forwarding information for the Ethernet address of MN 5000 has been registered in the forwarding tables of the Ethernet switches located in path 500, which include the root switch 1100, Ethernet switch 2 1200, Ethernet switch 4 1400 and Ethernet switch 7 1700 and W-AP2 2200.

W-AP2 2200 starts the handover procedure after it detects the disconnection of MN 5000. W-AP2 2200 starts buffering the frames destined for MN 5000. Since MN 5000 is not detached from W-AP2 2200, W-AP2 2200 does not generate the path-erase-upwards control signal. The detachment is initiated by request either from a mobile node or the network. The disconnection of a mobile node that has no hand-over procedure following is recognized as an uncoordinated detachment. If the disconnection is turned out to be a detachment later on, then W-AP2 should generate a path-erase-upwards control signal and send it through the root port.

W-AP2 2200 is the old access point for MN 5000 in the handover procedure. According to FIG. 9 through FIG. 11, MN 5000 moves into the coverage area of W-AP3 2300. W-AP3 2300 becomes the new access point for MN 5000 in the handover procedure. In operation 1203 of FIG. 12, W-AP2 2200, MN 5000 and W-AP3 2300 may share the wireless link status information for efficient switch-over of wireless links.

Referring to FIG. 10, the wireless link of MN 500 is switched from W-AP2 2200 into W-AP3 2300 in operation 1204 of FIG. 12. The W-AP3 2300 should then generate a path-setup control BPDU which includes the Ethernet address of MN 5000 in its control messages. In operation 1205 of FIG. 12, W-AP3 2300 sends the path-setup control BPDU to an upper Ethernet switch, for example, Ethernet switch 8 1800, through the RP. In operation 1210 of FIG. 12, W-AP3 2300 stores Ethernet frames destined for MN 5000 in buffer-2 910. For example, the Ethernet frames include Ethernet frames transmitted from the CN1 3100 along path 671, Ethernet frames transmitted from the CN2 3200 along path 681, and Ethernet frames transmitted from the CN3 3300 along path 691.

In operation 1206 of FIG. 12, Ethernet switch 8 1800 registers the forwarding information for the Ethernet address of MN 5000 into its forwarding table. In operation 1207, Ethernet switch 8 1800 transmits the path-setup control BPDU to an upper Ethernet switch through the RP. The path-setup control BPDU reaches Ethernet switch 2 1200 where the old path 500 and the new path 511 meet. Ethernet switch 2 1200 looks up the Ethernet address of MN 5000 in its forwarding table to identify the port for the old path and updates the forwarding information for MN 500 to be associated with the port for the new path as depicted in operation 1208 in FIG. 12. Switch 2 1200 generates a path-erase-downwards control BPDU and sends it through the port of the old path as shown in operation 1209 of FIG. 12. The Ethernet switch 2 1200 may either terminate transmitting the path-setup control BPDU or forwards it upwards through the RP as shown in operation 1211 in FIG. 12.

The path-setup control BPDU may reach the root switch 1 1100. As shown in operation 1212 in FIG. 12, the root switch then confirms or adds the forwarding information for MN 5000 into its forwarding table and stops forwarding the path-setup control BPDU, completing the establishment of a new path 511.

The path-erase-downwards control BPDU generated by switch 2 1200 is forwarded to all switches in the old path 500 deleting all the forwarding information for MN 5000 in the switches including switch 4 1400, switch 7 1700, and W-AP2 2200 as shown in operation 1213 in FIG. 12. If the path-erase-downwards control BPDU is received through a designated port, then the switch should ignore and discard it. The path-erase-downwards BPDU carries the Ethernet addresses of MN 5000 and W-AP3 2300. W-AP3 2300 is the new access point of the handover process depicted in FIG. 9 through FIG. 11. The path-erase-downwards BPDU is eventually delivered to the old access point W-AP2 2200 completing the destruction of the old path as depicted in operation 1214 of FIG. 12. In operation 1216 of FIG. 12, W-AP3 2200 retransmits frames stored in buffer-1 900 after it receives the path-erase-downwards control BPDU. The frames are retransmitted after their source addresses are replaced with RFA-2 which is a unique address assigned to the retransmitted frames in operation 1215 of FIG. 12. The Ethernet switches do not perform the source learning if the source address is RFA-2. The W-AP2 2200 generates a retransmission-complete control BPDU and send it to the new access point W-AP3 2300 through the root port in operation 1217 of FIG. 12. The destination address of the retransmission-complete control BPDU is the Ethernet address of W-AP3 2300, which has been delivered to W-AP2 2200 through the path-erase-downwards control signal.

The W-AP3 2300 which receives the frames retransmitted from the old access point forwards them to the final destination MN 5000 as depicted in operation 1216 of FIG. 12. When it receives the retransmission-complete control signal from the old access point, it forwards the frames stored in buffer-2 910 to MN 5000 as shown in operation 1218 of FIG. 12. The handover of MN 5000 from W-AP2 2200 to W-AP3 2300 is completed when all the frames buffered in buffer-2 910 are transmitted to MN 5000 as shown in operation 1219 of FIG. 12.

FIG. 10 illustrates the frame forwarding paths (solid lines) from all corresponding nodes, CN1 3100, CN2, 3200, and CN3 3300. It also shows the forwarding path (dotted line) for frames retransmitted from the old access point W-AP2 2200. The solid frame forwarding path are established as soon as the path-setup control signal reaches switch 2 1200, and switch 2 updates the its forwarding table as directed by the control signal. The dotted frame forwarding path are established when the path-erase-downwards control signal reaches the old access point W-AP2 2200.

FIG. 11 illustrates the frame forwarding paths (solid lines) for frames from all corresponding nodes after the handover is completed. W-AP2 has sent the retransmission-complete after it retransmitted all frames stored in buffer-1 900. W-AP3 2300 has received the retransmission-complete control signal and forwarded the frames stored in buffer-2 910 to MN 5000.

Figure 13:
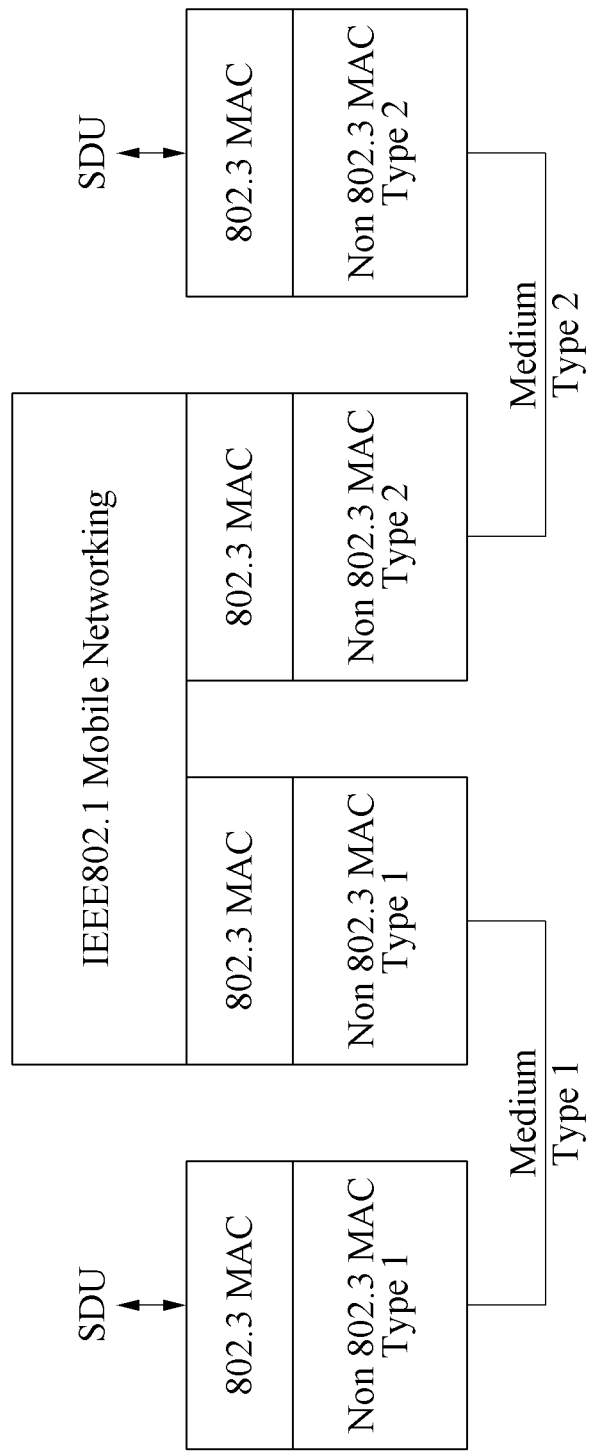
FIG. 13 is a diagram illustrating an example of a scheme of connecting a terminal to an Ethernet network according to an example embodiment.
Figure 14:
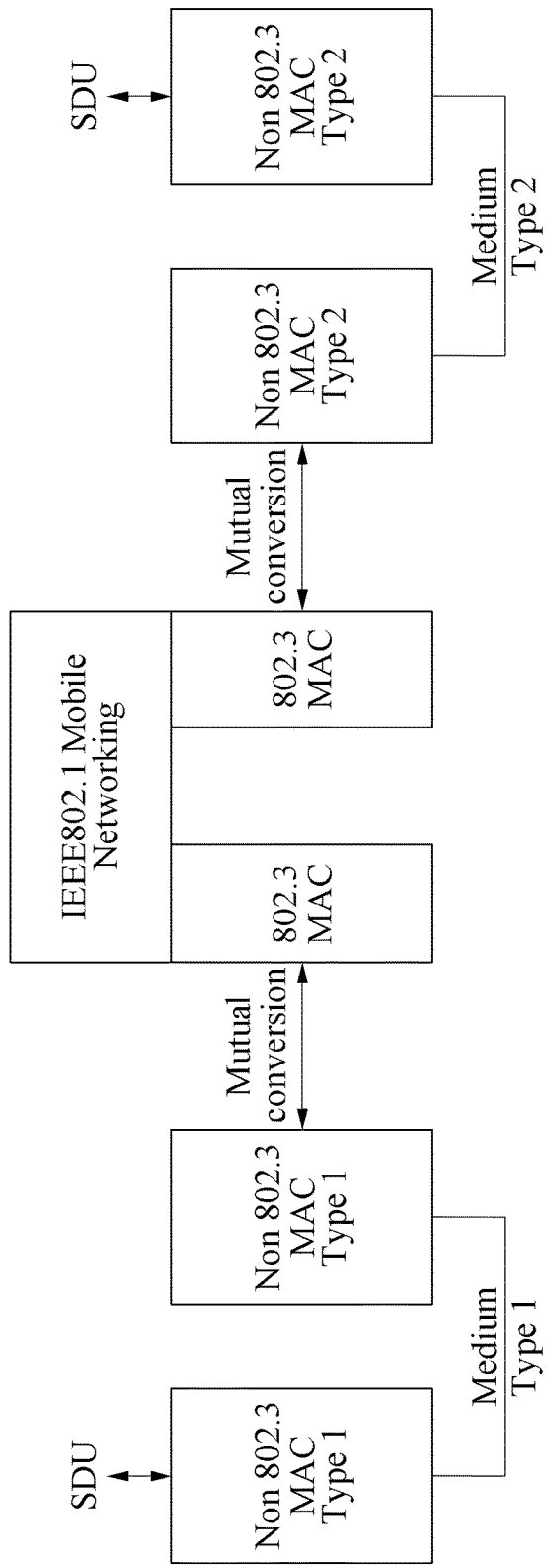
FIG. 14 is a diagram illustrating another example of a scheme of connecting a terminal to an Ethernet network according to an example embodiment.
Figure 15:
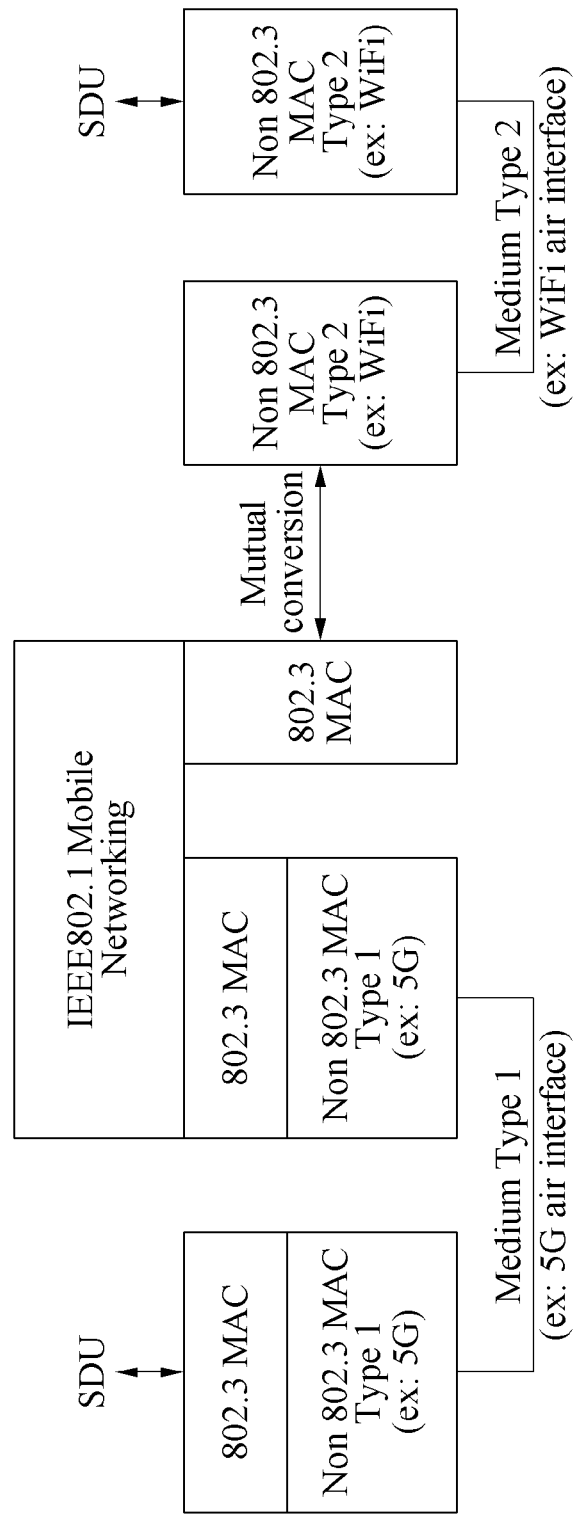
FIG. 15 is a diagram illustrating another example of a scheme of connecting a terminal to an Ethernet network according to an example embodiment.

FIGS. 13, 14 and 15 illustrate three schemes to connect the mobile nodes of various mobile networks to an Ethernet network according to an example embodiment. Hereinafter, the three schemes proposed in this invention are described using FIG. 13 through 15.

The first scheme is an overlay networking. FIG. 13 illustrate the overlay networking where IEEE802.3 MAC is deployed over the current MACs, which includes 3GPP LTE MAC, IEEE802.11 wireless MAC, etc. The mobile nodes of various wireless networks can directly be connected to the Ethernet network which has the Ethernet mobility capability proposed in this invention.

The second scheme is the MAC translation. FIG. 14 illustrates the MAC translation scheme. When mobile nodes having non IEEE802.3 MAC are connected to the Ethernet network in the Ethernet layer, the MAC frames are converted to the IEEE802.3 MAC frames. The IEEE802.11 wireless MAC can easily be converted into IEEE802.3 MAC. The 3GPP LTE MAC frames can also be converted into IEEE8022.3 MAC frames by mapping the unique ID of the 3GPP mobile node, such as equipment ID, with the IEEE802.3 MAC address.

The last scheme is the mixed scheme where the overlay networking and the MAC translation are applied wherever appropriate. FIG. 15 illustrates the mixed scheme that one mobile node uses the overlay networking while the other mobile node uses the MAC translation.

Figure 16:
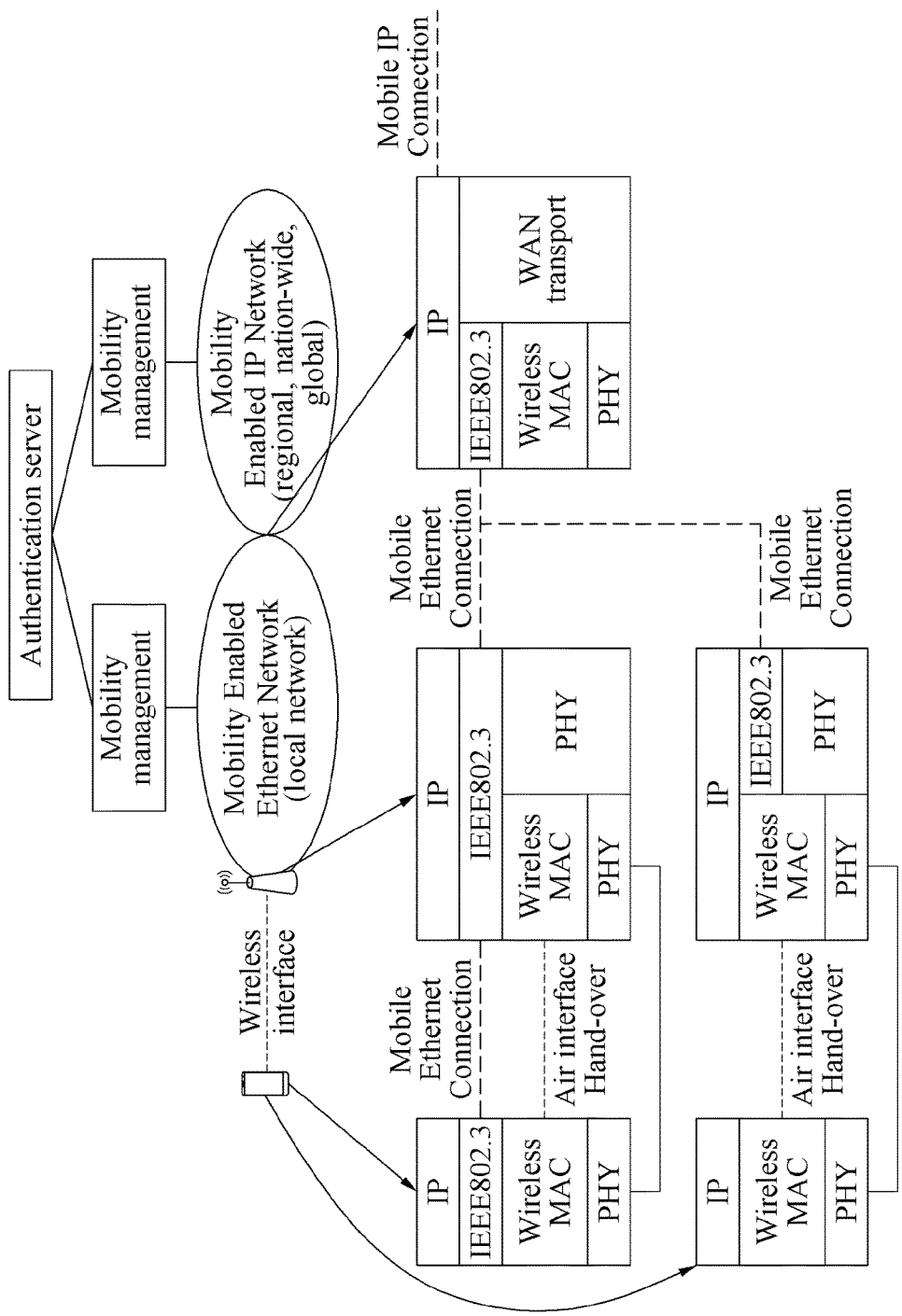
FIG. 16 is a diagram illustrating an example of a method of configuring a mobile network according to an example embodiment.

FIG. 16 is a diagram illustrating an example of a method of configuring a mobile network according to an example embodiment.

According to an example embodiment, a local network may be configured as an Ethernet network, and a regional network, a nation-wide network or a global network may be configured as an IP mobile network. Referring to FIG. 16, a wireless MAC may be connected through protocol stacks based on the schemes of FIGS. 13 and 14, and a mobility of the local network may be realized by an Ethernet network. In the regional network, the nation-wide network or the global network, an IP mobile network may be configured based on a mobility of an IP, for example, a Proxy Mobile IP (PMIP), a Mobile IP (MIP), and the like. In FIG. 16, a mobility management function of a mobile terminal may be required for each of an IP network and an Ethernet network. However, a configuration of the mobile network of FIG. 16 is merely an example, and may widely be varied according to the design requirement and deploying environment.

Figure 17:
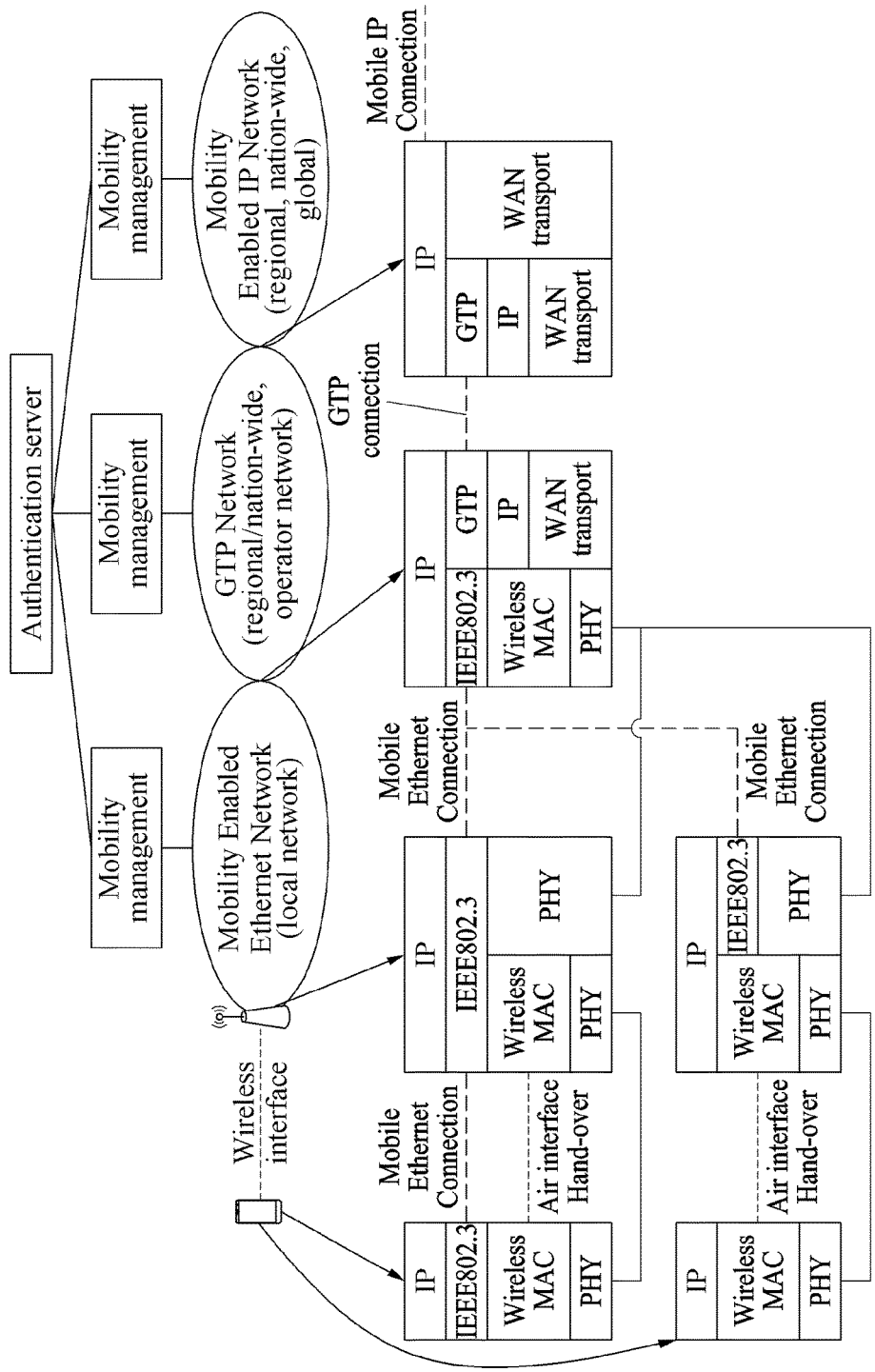
FIG. 17 is a diagram illustrating another example of a method of configuring a mobile network according to an example embodiment.

FIG. 17 illustrates another example of a method of configuring a mobile network according to an example embodiment. FIG. 17 is different from FIG. 16 in an aspect that a General Packet Radio Service (GPRS) Tunneling Protocol (GTP) is added as a regional network, a nation-wide network or an operator network.

Figure 18:
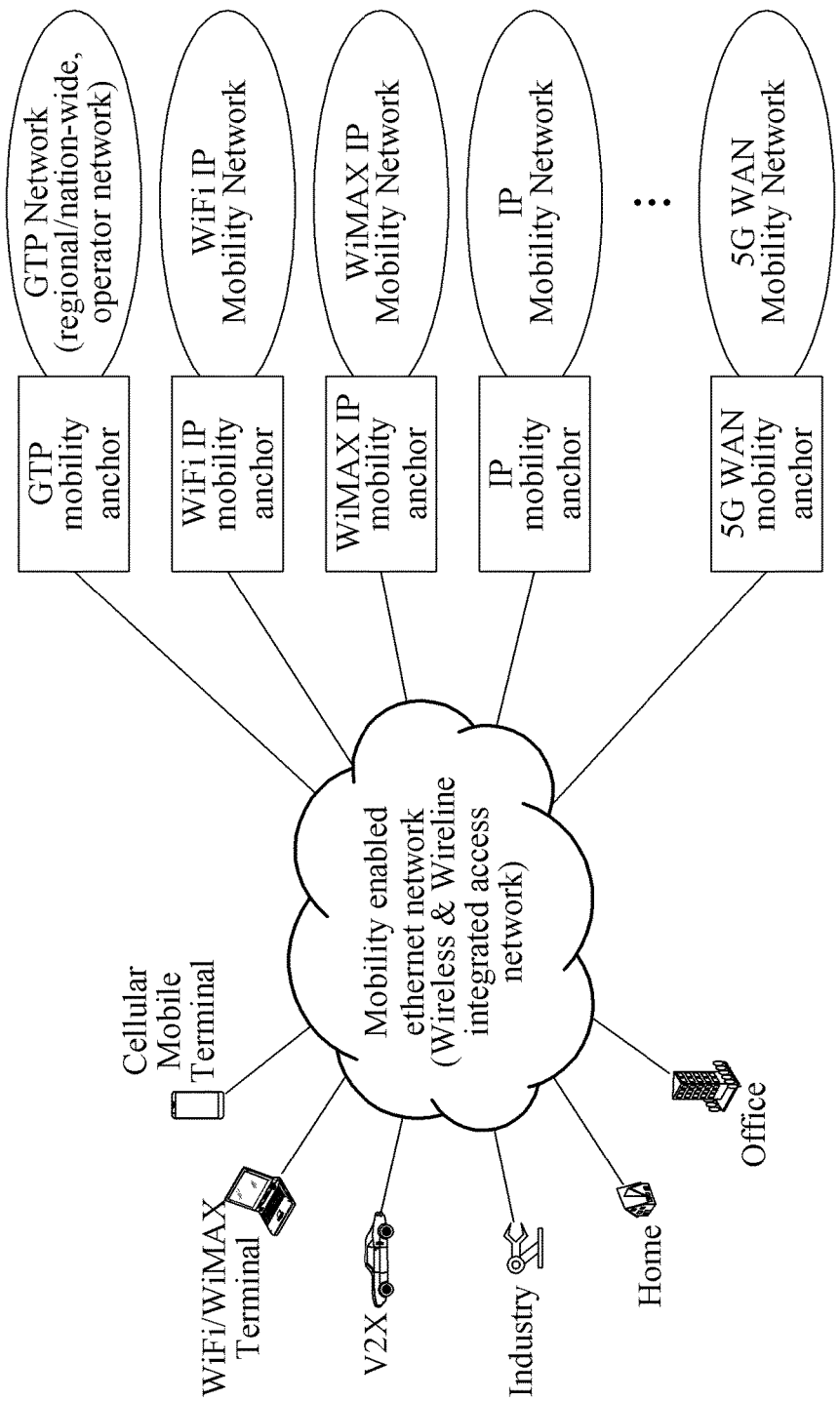
FIG. 18 is a diagram illustrating an example in which various wireless and wireline access networks can be merged into a mobile Ethernet network according to an example embodiment.

FIG. 18 illustrates an example in which various access networks are merged into a mobility enabled Ethernet access network according to an example embodiment.

An example embodiment may relate to an Ethernet network. The wireless terminal connected directly to the Ethernet network has been described above, however, there is no limitation thereto. The above-described example embodiments may be implemented by changing software of the Ethernet network. An IEEE-based wireless terminal may be connected directly to an Ethernet layer by a mutual conversion between MAC frames. A 3GPP wireless MAC, for example, an LTE, may have the same effect as if the IEEE-based wireless terminal virtually directly connected to the Ethernet layer. When an overlay scheme of an "IEEE802.3 MAC over wireless MAC" is applied, the IEEE-based wireless terminal may be actually directly connected to the Ethernet layer.

The above-described example embodiments may be implemented using hardware components, software components, and/or a combination thereof. For example, a processing device and components described herein may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combination thereof, to independently or collectively instructor configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A mobility method of an Ethernet switch, the mobility method comprising:
   receiving an Ethernet frame through a port of the Ethernet switch;
   transmitting the Ethernet frame to an upper Ethernet switch through a root port of the Ethernet switch based on whether a forwarding information for a destination address of the Ethernet frame exists in a forwarding table;
   receiving a path-setup control signal comprising an Ethernet address of a mobile node and an Ethernet address of an access point which generates the path-setup control signal;
   recording the Ethernet address of the mobile node in the forwarding table and a port through which the path-setup control signal is received, as a forwarding port of an Ethernet frame whose destination address is the Ethernet address of the mobile node; and
   transmitting the path-setup control signal to the upper Ethernet switch through the root port.

2. The mobility method of claim 1, wherein when the upper Ethernet switch is a root switch, the root switch is configured to discard the Ethernet frame, or to change a source address of the Ethernet frame so that the source address represents a reflected frame at the root switch and to broadcast the Ethernet frame through designated ports, based on whether the forwarding information for the destination address of the Ethernet frame exists in the forwarding table.

3. The mobility method of claim 1, further comprising:
   receiving an Ethernet frame with a source address representing a frame reflected from a root switch;
   omitting learning of the source address; and
   broadcasting the Ethernet frame with the source address representing the reflected frame through designated ports other than the root port, based on whether a forwarding information for a destination address of the Ethernet frame with the source address representing the reflected frame exists in the forwarding table.

4. The mobility method of claim 1, further comprising:
   when the forwarding port exists in the forwarding table, updating the forwarding port to the port through which the path-setup control signal is received.

5. The mobility method of claim 1, wherein the transmitting of the path-setup control signal comprises, when the forwarding port exists in the forwarding table and is the port through which the path-setup control signal is received, transmitting the path-setup control signal.

6. The mobility method of claim 1, further comprising:
when the forwarding exists in the forwarding table and is different from the port through which the path setting control signal is received, generating a path-erase-downwards control signal; and
transmitting the path-erase-downwards control signal to a lower Ethernet switch through the port which was set to forward the Ethernet frame destined for the mobile node before substituting the port with a new port,
wherein the path-setup control signal is generated by an access point to which the mobile node is either attached for the first time or connected to through handover,
wherein the path-erase-downwards control signal comprises the Ethernet address of the mobile node and an Ethernet address of the access point, and
wherein the Ethernet frame destined for the mobile node are temporarily stored in a buffer of the access point during the handover.

7. The mobility method of claim 1, wherein when the upper Ethernet switch receiving the path-setup control signal is a root switch, the root switch is configured to record in a forwarding table of the root switch the port, through which the path-setup control signal is received, as the forwarding port of the Ethernet frame, whose destination address is the Ethernet address of the mobile node, and to stop forwarding the path-setup control signal.

8. The mobility method of claim 1, further comprising:
receiving a path-erase-upwards control signal comprising an Ethernet address of a mobile node and an Ethernet address of an access point from which the mobile node is disconnected; and
when a forwarding port of an Ethernet frame destined for the mobile node exists in the forwarding table, deleting the forwarding port from the forwarding table and transmitting the path-erase-upwards control signal to the upper Ethernet switch through the root port.

9. The mobility method of claim 8, wherein when the upper Ethernet switch receiving the path-erase-upwards control signal is the root switch, and when the forwarding port of the Ethernet frame destined for the mobile node, exists in a forwarding table of the root switch, the root switch is configured to delete the forwarding port from the forwarding table of the root switch and to stop forwarding the path-erase-upwards control signal.

10. The mobility method of claim 8, wherein the path-erase-upwards control signal is generated by the access point from which the mobile node is disconnected, and comprises the Ethernet address of the mobile node, and
wherein the Ethernet frame destined for the mobile node is temporarily stored in a buffer of the access point.

11. The mobility method of claim 1, further comprising:
receiving a path-erase-downwards control signal comprising an Ethernet address of a mobile node and an Ethernet address of an access point to which the mobile node is connected through handover;
when a port through which the path-erase-downwards control signal is received is a designated port, discarding the path-erase-downwards control signal; and
when the port through which the path-erase-downwards control signal is received is the root port, transmitting the path-erase-downwards control signal to a lower Ethernet switch.

12. The mobility method of claim 11, wherein the transmitting of the path-erase-downwards control signal comprises, when an forwarding port for an Ethernet frame destined for the mobile node, exists in the forwarding table, transmitting the path-erase-downwards control signal through the forwarding port and deleting the forwarding port from the forwarding table.

13. The mobility method of claim 11, wherein the path-erase-downwards control signal further comprises an Ethernet address of a new access point to which the mobile node is connected through handover,
wherein an Ethernet frame destined for the terminal is temporarily stored in a buffer of the new access point,
wherein when an Ethernet frame, of which a source address is a special address indicating that is retransmitted from an old access point from which the mobile node is disconnected through handover, is received, the new access point is configured to forward the received Ethernet frame to the mobile node,
wherein when a retransmission-complete control signal comprising the Ethernet address of the mobile node is received, the new access point is configured to transmit the Ethernet frame stored in the buffer to the mobile node, and
wherein the retransmission-complete control signal is generated by the old access point.

14. The mobility method of claim 11, wherein the path-erase-downwards control signal is received by an old access point from which the mobile node disconnected during handover,
wherein an Ethernet frame destined for the terminal is stored in a buffer of the old access point,
wherein the old access point is configured to:
replace a source address of the Ethernet frame stored in the buffer with an unique special address so that other Ethernet switches recognize that the Ethernet frame is retransmitted from the old access point to the mobile node with the source address; and
transmit the Ethernet frame with the replaced source address to the mobile node after receiving the path-erase-downwards control signal; and
generate a retransmission-complete control signal comprising the Ethernet address of the mobile node and transmit the retransmission-complete control signal to a new access point to which the mobile node is newly connected during the handover, after finishing transmission of the Ethernet frame stored in the buffer.

15. The mobility method of claim 1, further comprising:
receiving a retransmission-complete control signal comprising an Ethernet address of a mobile node; and
transmitting the retransmission-complete control signal to a new access point using an Ethernet address of the new access point which is provided by a path-erase-downwards control signal,
wherein the retransmission-complete control signal is generated by an old access point disconnected from the mobile node, and
wherein the destination address comprises the Ethernet address of the new access point connected to the terminal by a handover.

* * * * *